United States Patent [19]
Tomiyama et al.

[11] Patent Number: 5,239,547
[45] Date of Patent: Aug. 24, 1993

[54] SELF-DIAGNOSIS AND SELF-REPAIR SYSTEM FOR IMAGE FORMING APPARATUS

[75] Inventors: Tetsuo Tomiyama, Chiba; Hiroyuki Yoshikawa; Yasushi Umeda, both of Tokyo; Yoshiki Shimomura, Kyoto, all of Japan

[73] Assignee: Mita Industrial Co., Ltd., Japan

[21] Appl. No.: 588,177

[22] Filed: Sep. 26, 1990

[51] Int. Cl.$^5$ .............................................. G06F 11/00
[52] U.S. Cl. ........................... 371/16.4; 371/29.1; 371/15.1; 395/911; 395/912; 395/916; 355/207; 364/DIG. 1; 364/276.3; 364/281.9
[58] Field of Search .................. 371/16.4, 15.1, 40.1, 371/10.1, 21.1, 23, 29.1; 355/207; 395/911, 912, 916

[56] References Cited

U.S. PATENT DOCUMENTS

| | | | |
|---|---|---|---|
| 4,245,309 | 1/1981 | Kiefer | 371/16.4 |
| 4,277,162 | 7/1981 | Kasahara et al. | 555/14 R |
| 4,755,966 | 7/1988 | Masuda | 371/16.4 |
| 4,809,280 | 2/1989 | Shonaka | 371/16.3 |
| 4,878,072 | 10/1989 | Reinten | 346/154 |
| 4,879,577 | 11/1989 | Mabrouk et al. | 355/208 |
| 5,107,500 | 4/1992 | Wakamoto et al. | 371/15.1 |
| 5,109,380 | 4/1992 | Ogino | 371/15.1 |
| 5,138,618 | 8/1992 | Honda et al. | 371/16.4 |

FOREIGN PATENT DOCUMENTS

| | | |
|---|---|---|
| 028167 | 7/1981 | European Pat. Off. |
| 63-240601 | 10/1988 | Japan |
| 63-255701 | 10/1988 | Japan |

OTHER PUBLICATIONS

Patent Abstracts of Japan, vol. 11, No. 219 (P-596) Jul. 16, 1987 & JP-A-62 035 916 (Canon).
Patent Abstracts of Japan, vol. 13, No. 007 (P-810) Jan. 10, 1989 & JP-A-63 214 679 (NEC).
Patent Abstracts of Japan, vol. 14, No. 160 (P-1028) Jan. 19, 1990 & JP-A-02 016 639 (NEC).
Tzafestas et al, "Modern Approaches to System/Sensor Fault Detection and Diagnosis", *Journal A*, vol. 31, No. 4, Antwerpen, BE, pp. 42–57, XP000178689 (Dec. 1990).
Umeda et al, "Model Based Diagnosis Using Qualitative Reasoning", as reprinted in Kimura and Rotstadas, editors, *Computer Applications in Production and Engineering*, Cape 1989, Tokyo, Japan, pp. 443–450 (Oct. 2–5, 1989).
Benjamin Kuipers, "Qualitative Simulation", *Artificial Intelligence*, 29, pp. 289–338 (1986).
Jeff Shrager, et al, "Issues in the Pragmatics of Qualitative Modeling: Lessons Learned from a Xerographics Project", *Communications of the ACM*, vol. 30, No. 12, pp. 1036–1047 (Dec. 1987).
Nishida, an article made available to the public on Jul. 23, 1990 at a meeting of the Artificial Intelligence Society in Japan; and an English translation of sections 10.2 and 10.3 of the Nishida article.

*Primary Examiner*—Robert W. Beausoliel, Jr.
*Assistant Examiner*—My-Phung Chung
*Attorney, Agent, or Firm*—Beveridge, DeGrandi, Weilacher & Young

[57] ABSTRACT

The system of the present invention has a plurality of sensors 1a, 1b and 1c and a system control circuit which includes a case memory portion and a work script memory portion. In response to application of state data from the sensors 1a, 1b and 1c, the system converts the state data into symbolic data. Then the symbolic data is evaluated to judge whether or not a fault exists and to specify a fault symptom. As a result of the judgement, a fault symptom and a fault in the objective machine are determined. Thereafter, cases stored in the case memory portion are retrieved on the basis of the results of the fault diagnosis and a fault simulation. A case which closely resembles the present state of the objective machine is selected. Then, repair work described in the selected case is executed.

48 Claims, 12 Drawing Sheets

PARAMETER X  0 LOW  20 NORMAL  23 HIGH

PARAMETER $V_s$  LOW  750 NORMAL  760 HIGH

PARAMETER $O_s$  LOW  8 NORMAL  15 HIGH

PARAMETER $V_n$  LOW  600 NORMAL  800 HIGH

SELF-DIAGNOSIS AND SELF-REPAIR SYSTEM FOR IMAGE FORMING APPARATUS

BACKGROUND OF THE INVENTION

1. Field of the Invention

The present invention relates generally to a self-diagnosis and self-repair system for an image forming apparatus, and more particularly, to a system capable of making self-diagnose and self-repair of the operating state and the like of an image forming apparatus utilizing artificial intelligence and knowledge engineering which have been being studied extensively in recent years.

2. Description of the Prior Art

In the development field of precision instruments, industrial machines and the like, expert systems utilizing artificial intelligence (so-called AI) techniques have been being studied extensively in recent years for the purpose of realizing labour saving in maintenance work and long-term automatic operation. The expert systems include one for making self-diagnose to judge whether or not a fault is caused in an apparatus and making self-repair of the fault caused.

In a fault diagnosis system by the conventional expert system, such limitations have been pointed out that (a) there is no versatility in knowledge, which makes it impossible to make fault diagnosis on a variety of objects, (b) diagnosis cannot be made on unknown faults, (c) the quantity of knowledge required for fault diagnosis is increased explosively as an object becomes complicated, thus making implementation difficult, (d) it is difficult to acquire knowledge, and the like.

More specifically, in a conventional automatic control system and fault diagnosis system, an actuator corresponding to a sensor is basically made to operate on the basis of an output of the sensor. That is, a type of automatic control and fault diagnosis has been made by a predetermined combination of a sensor and an actuator. Accordingly, a certain sensor basically corresponds to a particular actuator, and the relationship therebetween has been stationary. Therefore, the conventional system has the following disadvantages:

(1) The relationship between parameters of the sensor and parameters of the actuator must be clearly expressed numerically.

(2) From the reason mentioned in the above item (1), the relationship between parameters of the sensor and parameters of the actuator depends largely on an object. Accordingly, the conventional system is lacking in versatility, that is, cannot be utilized for a variety of objects.

(3) The relationships between parameters of respective sensors and between parameters of respective actuators have no relation with control. Consequently, only simple control based on the relationship between parameters of the sensors and parameters of the actuators which correspond to each other can be carried out, and faults which can be coped with are previously restricted.

More specifically, in the designing stage, faults which might occur must be forecast and mechanisms for countermeasures against the faults must be incorporated, and unknown faults cannot be handled.

(4) From the reason mentioned in the above item (3), secondary effects exerted on parameters of other actuators which might be caused by the operation of parameters of an arbitrary actuator.

Thus, in the conventional automatic control system and fault diagnosis system, only fault diagnosis based on sets respectively including independent sensors and actuators and fault repair based on the fault diagnosis have been made in such a manner that forecasting fault A is made on the basis of a set A of a sensor A and an actuator A, forecasting fault B is made on the basis of a set B of a sensor B and an actuator B, and forecasting fault C is made on the basis of a set C of a sensor C and an actuator C.

SUMMARY OF THE INVENTION

The present invention has been made for eliminating the disadvantages of the prior art and has for its object to provide a new self-diagnosis and self-repair system for an image forming apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Summary of system composition

Figure 1:
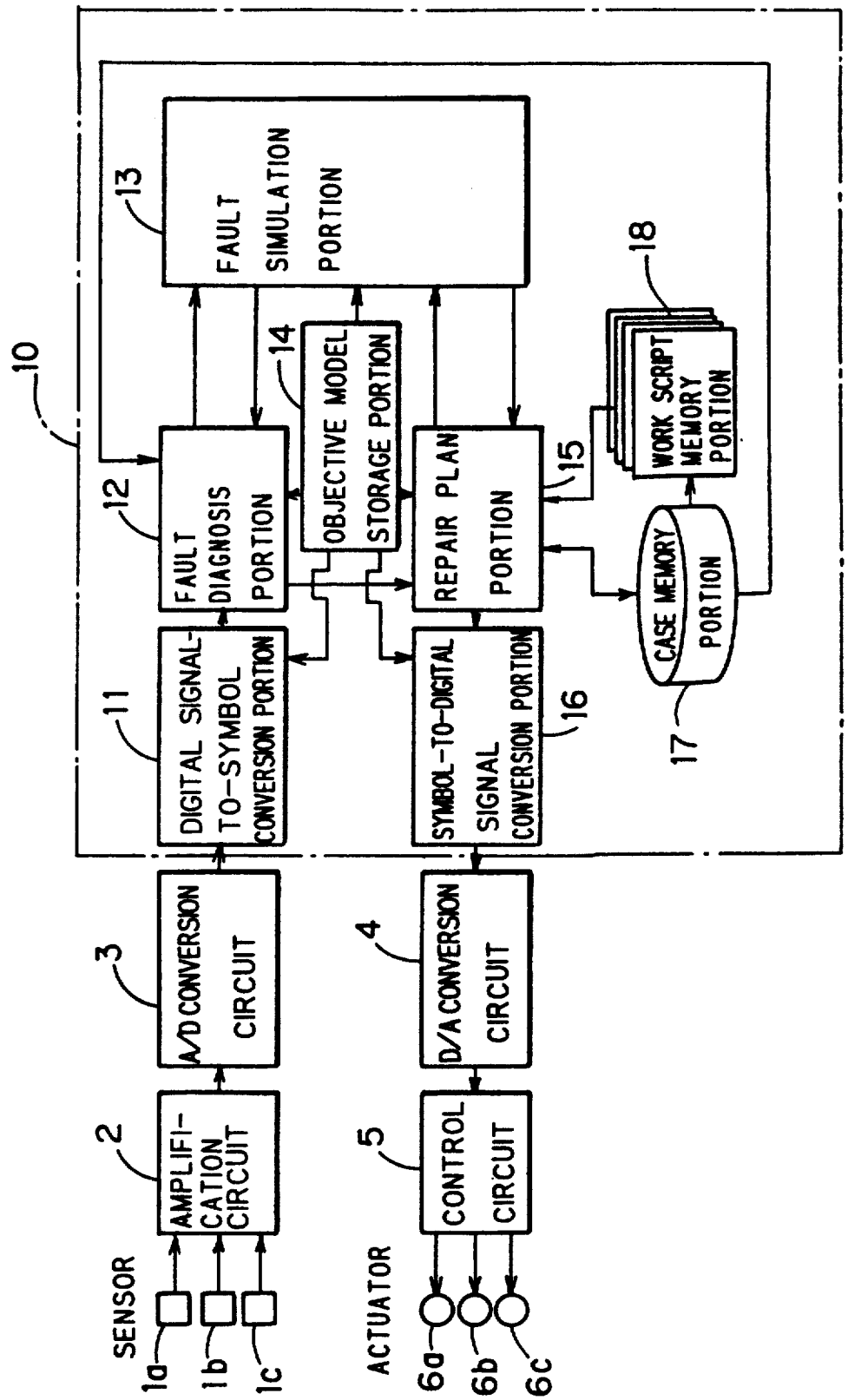
FIG. 1 is a block diagram showing the construction of a system according to an embodiment of the present invention.

FIG. 1 is a block diagram showing the construction of a system according to an embodiment of the present invention. This system comprises a plurality of sensors 1a, 1b and 1c installed on an objective machine and a plurality of actuators 6a, 6b and 6c for changing function states or the like of the objective machine.

The plurality of sensors 1a, 1b and 1c are respectively used for detecting the change of elements of the objective machine or relevant states among the machine elements which occurs by the operation of the objective machine. Information which are taken in from the plurality of sensors 1a, 1b and 1c, respectively, are amplified by an amplification circuit 2, converted from analogue signals to digital signals by an A/D conversion circuit 3, and applied to a system control circuit 10.

The system control circuit 10 comprises a digital signal-to-symbol conversion portion 11, a fault diagnosis portion 12, a fault simulation portion 13, an objective model storage portion 14, a repair plan portion 15 and a symbol-to-digital signal conversion portion 16. In addition, a case memory portion 17 and a work script memory portion 18 are connected to the repair plan portion 15.

The digital signal-to-symbol conversion portion 11 is used for converting the digital signal applied from the A/D conversion circuit 3 into qualitative information, that is, has the converting function for converting the digital signal into any one of three symbols, for example, "normal", "high" and "low". The signals applied from the sensors 1a, 1b and 1c are converted into such qualitative information symbolized, thereby to make it easy to make an approach to fault diagnosis. The symbols are not limited to "normal", "high" and "low" in this example. For example, the symbols may be other expressions such as "on" and "off" or "A", "B", "C" and "D". When the digital signal is converted into a symbol in the conversion portion 11, characteristic data intrinsic to the objective machine which is stored in the objective model storage portion 14 is referred to. The details of this characteristic data and the signal conversion will be described later.

The fault diagnosis portion 12 and the fault simulation portion 13 constitute a composition portion for judging whether or not a fault exists and making fault diagnosis by comparing the symbol converted in the digital signal-to-symbol conversion portion 11 with fault diagnosis knowledge stored in the objective model storage portion 14 and consequently, representing the fault state of the objective machine by the qualitative information, that is, the symbol and outputting the same.

The repair plan portion 15, the case memory portion 17 and the work script memory portion 18 constitute a composition portion for inferring a repair plan and deriving repair work on the basis of the results of inference of, if a fault exists, the fault in fault diagnosis. In making inference in the repair plan and deriving the repair work, a case concerning past success in repair which is stored in the case memory portion 17 is retrieved, and a work script for executing the case retrieved (a series of work units for performing a repair operation) is selected from the work script memory portion 18. In addition, qualitative data (as described in detail later) which is stored in the objective model storage portion 14 is made use of.

Meanwhile, the methods of making the fault diagnosis, making the fault simulation, inferring the repair plan and deriving the repair work in the fault diagnosis portion 12, the fault simulation portion 13, the repair plan portion 15, the case memory portion 17 and the work script memory portion 18 will be described in detail later.

The repair work outputted from the repair plan portion 15 is converted into a digital signal in the symbol-to-digital signal conversion portion 16 by referring to the information stored in the objective model storage portion 14.

The digital signal is converted into an analogue signal in a D/A conversion portion 4 and applied to an actuator control circuit 5. The actuator control circuit 5 selectively operates the plurality of actuators 6a, 6b and 6c to perform repair work on the basis of the analogue signal applied, that is, an actuator control instruction.

Figure 2:
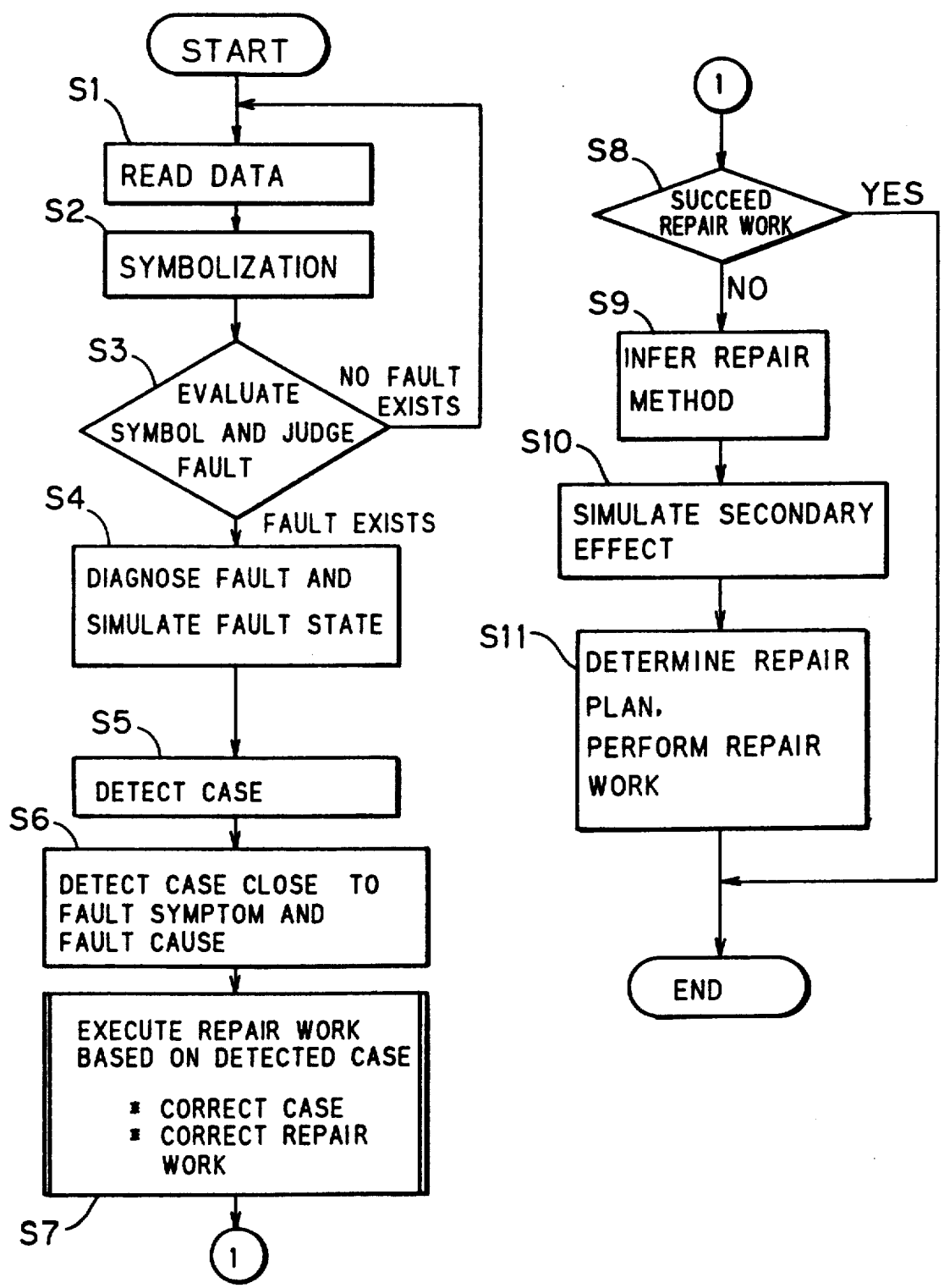
FIG. 2 is a flow chart showing an operation of a control circuit shown in FIG. 1.

FIG. 2 is a flow chart showing the processing of the system control circuit 10 shown in FIG. 1. Referring now to FIG. 2, the outline of the processing of the system control circuit 10 shown in FIG. 1 will be described.

A detection signal of the sensor 1a, 1b or 1c is amplified and converted into a digital signal, to be read in the system control circuit 10 for each predetermined read cycle, for example (step S1).

The digital signal read is symbolized in the digital signal-to-symbol conversion portion 11 (step S2). This symbolization is achieved on the basis of the characteristic data, that is, reference value data intrinsic to the objective machine which is previously set in the objective model storage portion 14. For example, the output ranges of the respective sensors 1a, 1b and 1c are set as follows as the reference value data intrinsic to the objective machine in the objective model storage portion 14.

That is:
sensor 1a:
output of less than $ka_1$ = low
output of $ka_1$ to $ka_2$ = normal
output of more than $ka_2$ = low
sensor 1b:
output of less than $kb_1$ = low
output of $kb_1$ to $kb_2$ = normal
output of more than $kb_2$ = high
sensor 1c:
output of less than $kc_1$ = low
output of $kc_1$ to $kc_2$ = normal
output of more than $kc_2$ = high.

In the digital-to-symbol conversion portion 11, each of the digital signals from the sensors 1a to 1c is converted into a symbol, for example, "low", "normal" or "high" on the basis of the reference value data intrinsic to the above described objective machine which is set in the objective model storage portion 14.

Then, the symbol obtained by the conversion is evaluated in the fault diagnosis portion 12, to judge whether or not a fault exists and specify the fault symptom (step S3). Fault diagnosis knowledge stored in the objective model storage portion 14 is made use of so as to judge whether or not a fault exists and specify the fault symptom by the evaluation of the symbol. The fault diagnosis knowledge is, for example, a set condition that a particular parameter must be, for example, "normal". If the particular parameter is not "normal", it is judged that a fault exists and the fault symptom is specified depending on what the particular parameter is. If no fault exists, the routine of the steps S1, S2 and S3 is repeated.

If it is judged in the step S3 that a fault exists, inference of the state of the objective machine is drawn, that is, fault diagnosis and simulation of the fault state are made (step S4).

More specifically, a parameter which causes a fault is retrieved in the fault diagnosis portion 12 on the basis of qualitative data qualitatively representing behaviors or attributes of respective elements constituting an apparatus and the combinational relationship between the elements which are stored in the objective model storage portion 14, and simulation of the fault state is made in the fault simulation portion 13 on the assumption that the parameter retrieved is the fault. Further, in the fault diagnosis portion 12, the result of the simulation is compared with the present value of the parameter, and the justification of the assumption that the parameter retrieved is the fault is judged. The foregoing processing is performed with respect to a plurality of parameters to be retrieved.

As the results of the judgement whether or not a fault exists, the fault diagnosis and the simulation of the fault state, the fault symptom and the fault of the objective machine are determined. The fault symptom means the change in output condition or the like of the objective machine (for example, "lightly printed copy" or the like in a paper copier taken as an example), and the fault means the change in mechanism and structure of the objective machine which causes the change of a symbol (for example, "decrease in halogen lamp quantity of light" in a paper copier taken as an example).

Then, a lot of cases stored in the case memory portion 17 are retrieved by the repair plan portion 15 on the basis of the results of the fault diagnosis and the simulation of the fault state (step S5). A case close to the present state of the objective machine is detected (step S6). This detection of the case is performed based on whether the fault and the fault symptom respectively coincide with those in the state of the objective machine.

Repair work based on the detected case is executed (step S7). In the repair work, the case and the repair work are corrected as required. The corrected case is registered as a new case.

If the repair work based on the case succeeded, the processing is terminated (YES in step S8). On the other hand, if the repair work based on the case did not succeed (NO in step S8), inference of the repair method is drawn (step S9). In addition, simulation of the secondary effect is made (step S10), and a repair plan is determined and repair work based on the determination is performed (step S11).

The inference and the execution of the work in the steps S9 to S11 are not based on the case. When the repair work based on this inference succeeded, however, the results of the repair are registered as a new case in the case memory portion 17.

A method of the fault diagnosis and fault repair will be described in detail with reference to a concrete example. In the following, the method taking the peripheral portion of a photosensitive drum in a small-sized plain paper copier as an objective machine will be described by way of example.

Description taking specific objective machine as example

Construction and state of objective machine

Figure 3:
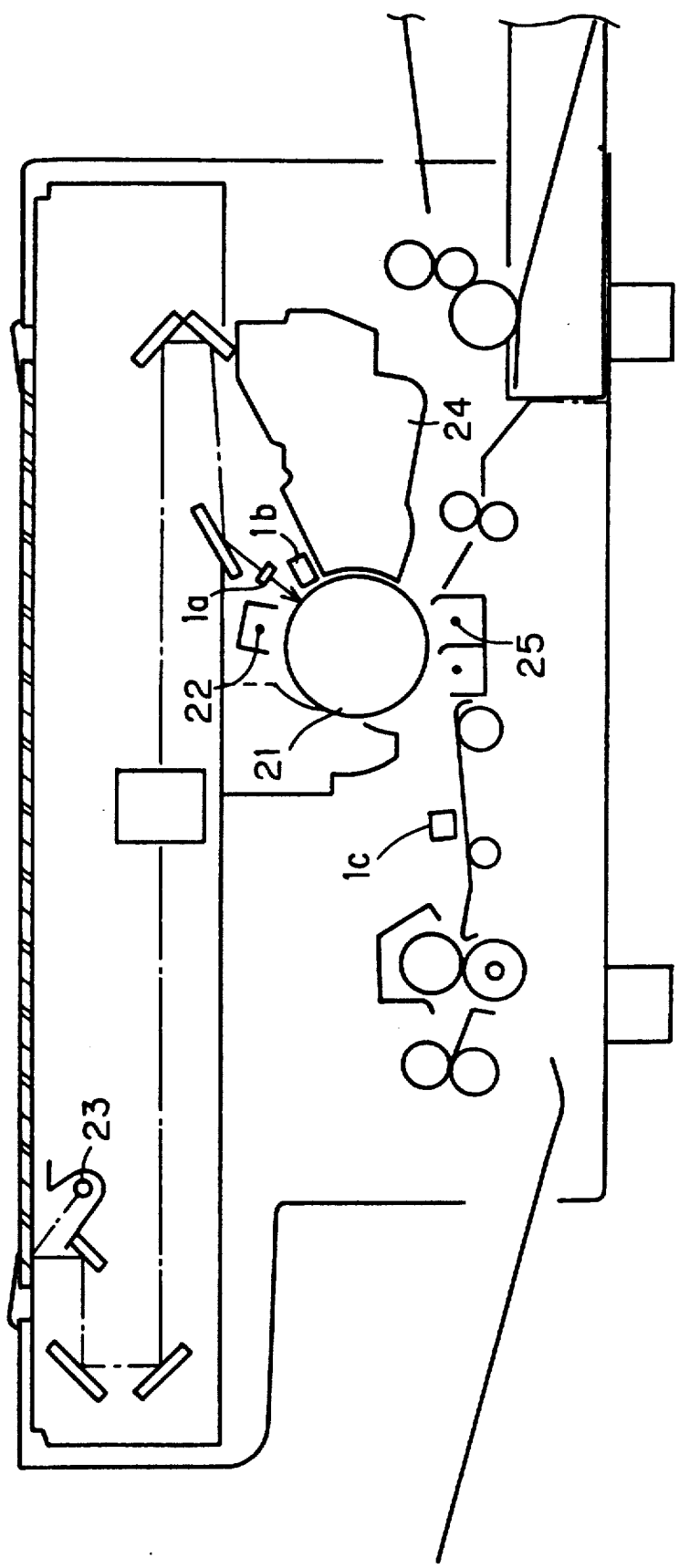
FIG. 3 is a diagram showing the schematic construction of the present invention which is applied to a plain paper copier.

FIG. 3 is an illustration showing a specific objective machine. In FIG. 3, reference numeral 21 designates a photosensitive drum, 22 designates a principal electro static charger, 23 designates a halogen lamp for copy illumination, 24 designates a developing device, and 25 designates a transfer charger.

In the present embodiment, three sensors 1a, 1b and 1c are provided, for example. That is, the sensor 1a is an AE sensor for measuring the quantity of light incident on the photosensitive drum, the sensor 1b is a surface potential sensor for measuring a surface potential of the photosensitive drum, and the sensor 1c is a densitometer for measuring the density of a picture image copied on paper.

Furthermore, three types of actuators are provided, which are not shown in FIG. 3. That is, three volumes, that is, a principal charge volume VR1 for changing a principal charge voltage of the photosensitive drum, a lamp volume AVR for controlling the quantity of light of the halogen lamp, and a transfer volume VR2 for controlling a transfer voltage between the photosensitive drum and copy paper are provided as the actuators.

Meanwhile, when the objective machine shown in FIG. 3 is looked at from a physical point of view, the objective machine is expressed as a combination of a plurality of elements on a substance level, and behaviors and attributes of the respective elements as well as the combinational relationship among the respective elements are expressed qualitatively using parameters as shown in Table 1. The expression form as shown in Table 1 will be referred to as a "substance model".

Figures 4, 5:
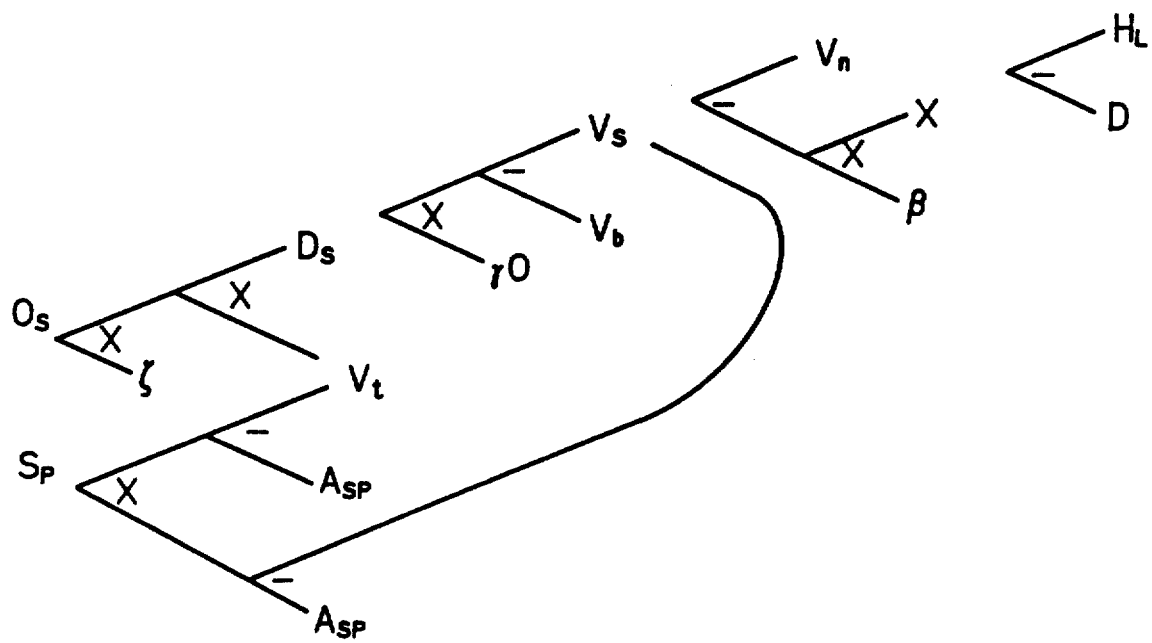
FIG. 4 is a diagram showing a mathematical model in the present embodiment.
FIG. 5 is a diagram showing reference value data of respective parameters required to symbolize the respective parameters.

Furthermore, the expression of FIG. 4 in which the substance model is abstracted and shown as a combined tree of the respective parameters will be referred to as a "mathematical model".

Additionally, the "substance model" and the "mathematical model" are referred to as an "objective model" collectively. The "objective model" is qualitative data common to image forming apparatuses which is also made use of for fault repair as described later.

TABLE 1

"Substance Model"

| | Exposure portion: $X = H_L - D$ |
|---|---|
| $X$: | logarithm of original reflected quantity of light |
| $H_L$: | logarithm of halogen lamp output quantity of light |
| $D$: | optical density of copy |
| | Photosensitive portion: $V_s = V_n - \beta X$ |
| $V_s$: | surface potential after exposure |
| $V_n$: | surface potential after principal charge |
| $\beta$: | sensitivity of photosensitive substance |
| | Development portion: $D_s = \gamma_0(V_s - V_b)$ |
| $D_s$: | toner density on drum |
| $\gamma_0$: | toner sensitivity |
| $V_b$: | bias voltage |
| | Output portion: $O_s = \xi \cdot V_t \cdot D_s$ |
| $O_s$: | toner density on output paper |
| $\xi$: | sensitivity of paper |
| $V_t$: | transfer voltage |
| | Separation portion: $S_p = (V_t - A_{sp}) \cdot (V_s - A_{sp})$ |
| $S_p$: | adsorbing force between drum and paper |
| $A_{sp}$: | amplitude of separating AC voltage |

The respective contents of the substance model and the mathematical model which serve as qualitative data are stored in the objective model storage portion 14.

Furthermore, in the objective model storage portion 14, reference value data which are measured in plant shipment, for example, are stored with respect to a predetermined parameter out of parameters included in the substance model. This reference value data is characteristic data intrinsic to this image forming apparatus.

For example, in this machine, reference value data specifying the ranges of "low", "normal" and "high" are stored with respect to parameters $X$, $V_s$, $O_s$ and $V_n$, respectively, as shown in FIG. 5.

Meanwhile, in the present embodiment, the above described reference value data can be renewed in response to sensing data in the process of the later fault diagnosis and fault repair, the change in operating state of the objective machine and the like.

Additionally, function evaluation knowledge used as an example of the fault diagnosis knowledge to be a basis for judging whether or not the objective machine is normally operated is stored in the objective model storage portion 14 on the basis of the symbol converted.

Meanwhile, the function evaluation knowledge, that is, the fault diagnosis knowledge may be one which is intrinsic to the objective machine or may be one which is not intrinsic thereto but is widely common to image forming apparatuses.

The function evaluation knowledge includes the following knowledge:

| picture image density | $O_s$ = normal |
| fog degree | $O_s'$ < normal |
| separation performance | $S_p$ < normal |

Here, when $O_s$, $O_s'$ and $S_p$ do not meet the above described conditions, the objective machine is not normally operated.

Let's consider a case where digitalized sensor information of the objective machine in a normal operation takes the following values:

AE sensor value $X = 30$ surface potential sensor value $V_s = 300$ densitometer value $O_s = 7$.

Furthermore, it is defined that:

densitometer value $O_s$ = fog degree $O_s'$ in a case where a blank original at optical density $D = 0$ is used, and surface potential sensor value $V_s$ = dark potential $V_n$ in a state where the halogen lamp is put off, and it is assumed that there values were:

fog degree $O_s' = 50$ dark potential $V_n = 700$.

Meanwhile, measurements of the fog degree $O_s'$ and the dark potential $V_n$ may be made through a manual operation, or may be programmed so as to be made automatically under constant conditions, for example, whenever the power supply of the objective machine is turned on or before copying is started. In the present embodiment, the latter is adopted.

The values X, $V_s$, $O_s$, $O_s'$ and $V_n$ obtained by the AE sensor 1a, the surface potential sensor 1b and the densitometer 1c are respectively converted into symbols in the digital signal-to-symbol conversion portion 11.

As described in the foregoing, the conversion is made in such a manner that the digital value given from the sensor 1a, 1b or 1c is compared with the reference value data serving as the characteristic data stored in the objective model storage portion 14, and is converted into any one of three types of symbols "normal", "high" and "low".

In the present embodiment, respective parameters are symbolized as follows:

X = high $V_s$ = low

Os = low $V_n$ = normal.

In the fault diagnosis portion 12, these respective parameters symbolized are compared with the function evaluation knowledge serving as an example of the fault diagnosis knowledge which is stored in the objective model storage portion 14. As a result, since the picture image density $O_s$ is not "normal", it is judged that a fault exists and the fault symptom is "picture image density too low ($O_s$ = low)". Inference in the fault diagnosis, that is, inference of the fault is then drawn with "$O_s$ = low" being the fault symptom.

Fault diagnosis technique

First, fault diagnosis is made in the fault simulation portion 13 using the mathematical model shown in FIG. 4, to retrieve parameters which may cause $O_s$ = low.

Figure 6:
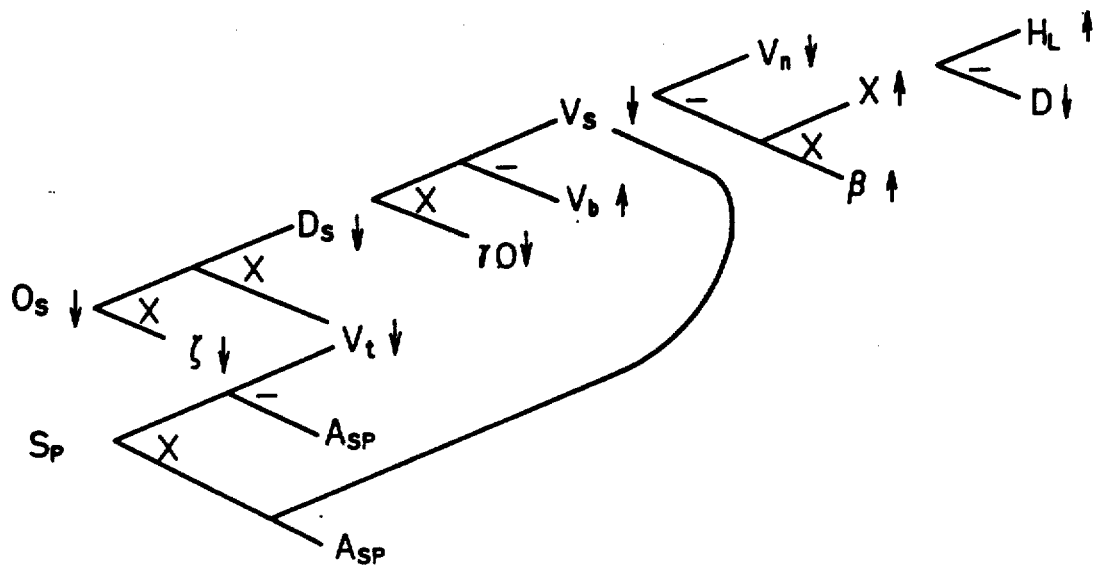
FIGS. 6 and 7 are diagrams showing development on the mathematical model for fault diagnosis.

The parameters which may decrease $O_s$ are pointed out on the mathematical model in FIG. 4, as shown in FIG. 6. In FIG. 6, parameters marked with upward arrows or downward arrows are parameters which may cause $O_s$ = low, the parameters marked with the upward arrows causing $O_s$ = low when they are increased and the parameters marked with the downward arrows causing $O_s$ = low when they are decreased.

Then, the causes of changing parameters are detected the fault diagnosis portion 12 with respect to parameters $\xi$, $D_s$, $V_t$, $\gamma_O$, $V_b$, $V_s$, $V_n$, X, $\beta$, $H_L$ and D that might cause $O_s$ = low which have been retrieved on the mathematical model.

This detection is performed on the basis of the substance model shown in Table 1. In the present embodiment, inference of the following fault candidates is drawn. That is:

$V_t$ = low: →defective transfer transformer $\xi$ = low: →deterioration of paper $V_b$ = high: →improper development bias $\gamma_O$ = low: →deterioration of toner $V_n$ = low: →improper principal charge voltage $H_L$ = high: →improper setting of halogen lamp D = low: →lightly printed original The foregoing knowledge, for example, $V_t$ = low means "defective transfer transformer", $\xi$ = low means "deterioration of paper", or $V_b$ = high means "improper development vias" is fault cause knowledge. This knowledge is included in qualitative data common to the image forming apparatuses.

$\beta$ out of the parameters is excluded because it is the sensitivity of the photosensitive drum and is not increased. $D_s$, $V_s$ and X are also excluded because they are expressed by other parameters.

Simulation of the fault state is made in the fault simulation portion 13 for the above described inference which has been drawn in the fault diagnosis portion 12.

The simulation of the fault state means drawing inference on the states of the objective machine in a case where the faults inferred occur. More specifically, it is assumed that the cause of creating $O_s$ = low, that is, the fault is, for example, "defective transfer transformer", to set $V_t$ = low on the mathematical model in a normal state. Then, the effects exerted on respective parameters in such a state are examined on the mathematical model. If $V_t$ = low is set, $O_s$ = low and $S_p$ = low are created and the other parameters are all "normal". Accordingly, this is contradictory to X = high and $V_s$ = low obtained from the sensors. Therefore, such a conclusion is drawn that the inference of the fault is in error.

Similarly, $\xi$ = low is set on the mathematical model in the normal state and the result thereof is compared with the symbol obtained from the sensor. Also in this case, a contradiction is found because X = normal on the mathematical model while the symbol from the sensor is X = high. Accordingly, it is judged that the inference of the fault is in error.

Simulation of the fault states is thus made with respect to all the fault candidates, to confirm whether or not the inference of the fault is right.

As a result, in the present embodiment, such a conclusion is drawn that the result which coincides with the actual state of the objective machine is obtained if the fault is "improper setting of halogen lamp ($H_L$ = high)" and the other fault candidates are all contradictory to the actual state of the machine.

Accordingly, it is possible to conclude that the fault in this case is "improper setting of halogen lamp". The states of the respective parameters of the objective machine at that time are as shown in Table 2.

TABLE 2

| Improper Setting of Halogen Lamp | | | | | |
|---|---|---|---|---|---|
| $H_L =$ | high | $V_b =$ | normal | $A_{sp} =$ | normal |
| $D =$ | normal | $\gamma_O =$ | normal | $S_p =$ | low |
| $X =$ | high | $D_s =$ | low | | |
| $\beta =$ | normal | $V_t =$ | normal | | |
| $V_n =$ | normal | $\xi =$ | normal | | |
| $V_s =$ | low | $O_s =$ | low | | |

Figure 7:
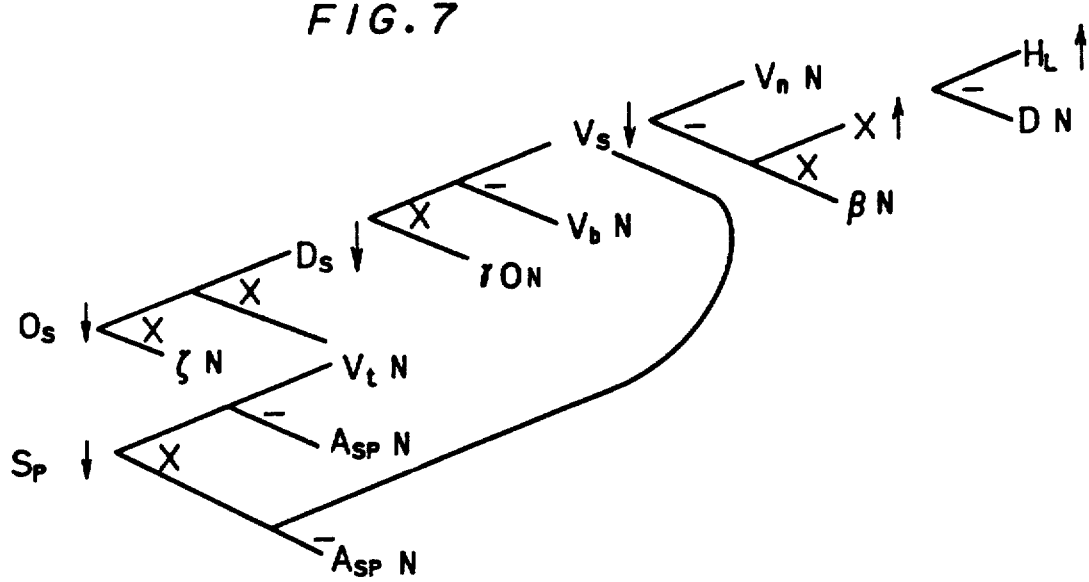

FIG. 7 is obtained when the states of the parameters shown in Table 2 are traced on the mathematical model. In FIG. 7, a downward arrow, an upward arrow and N which are marked on the right side of each of the parameters respectively indicate "low", "high" and "normal".

Execution of repair work

Figure 8A:
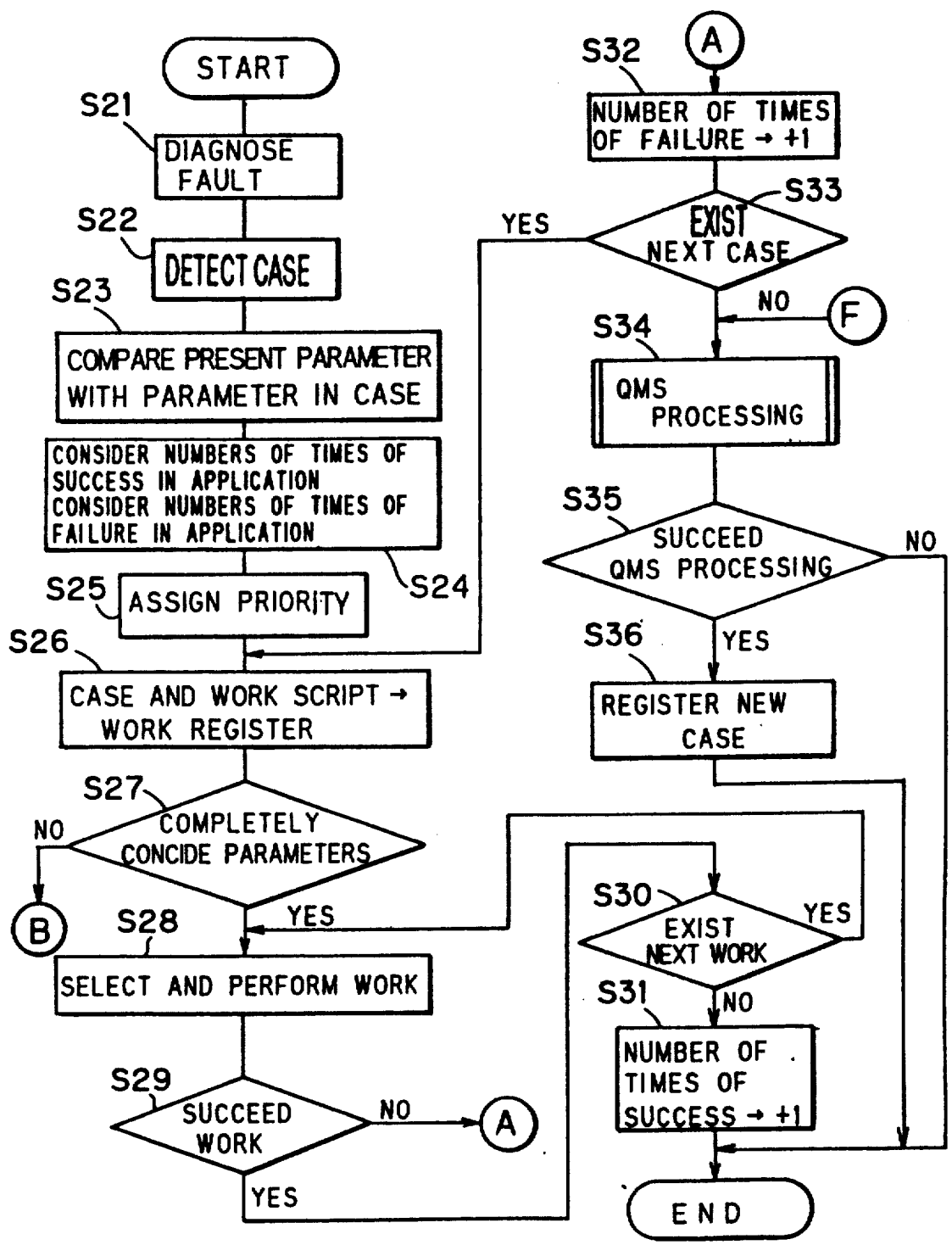
FIG. 8 (A-C) are flow charts showing processing of repair work to which cases in an embodiment of the present invention are applied.
Figure 8B:
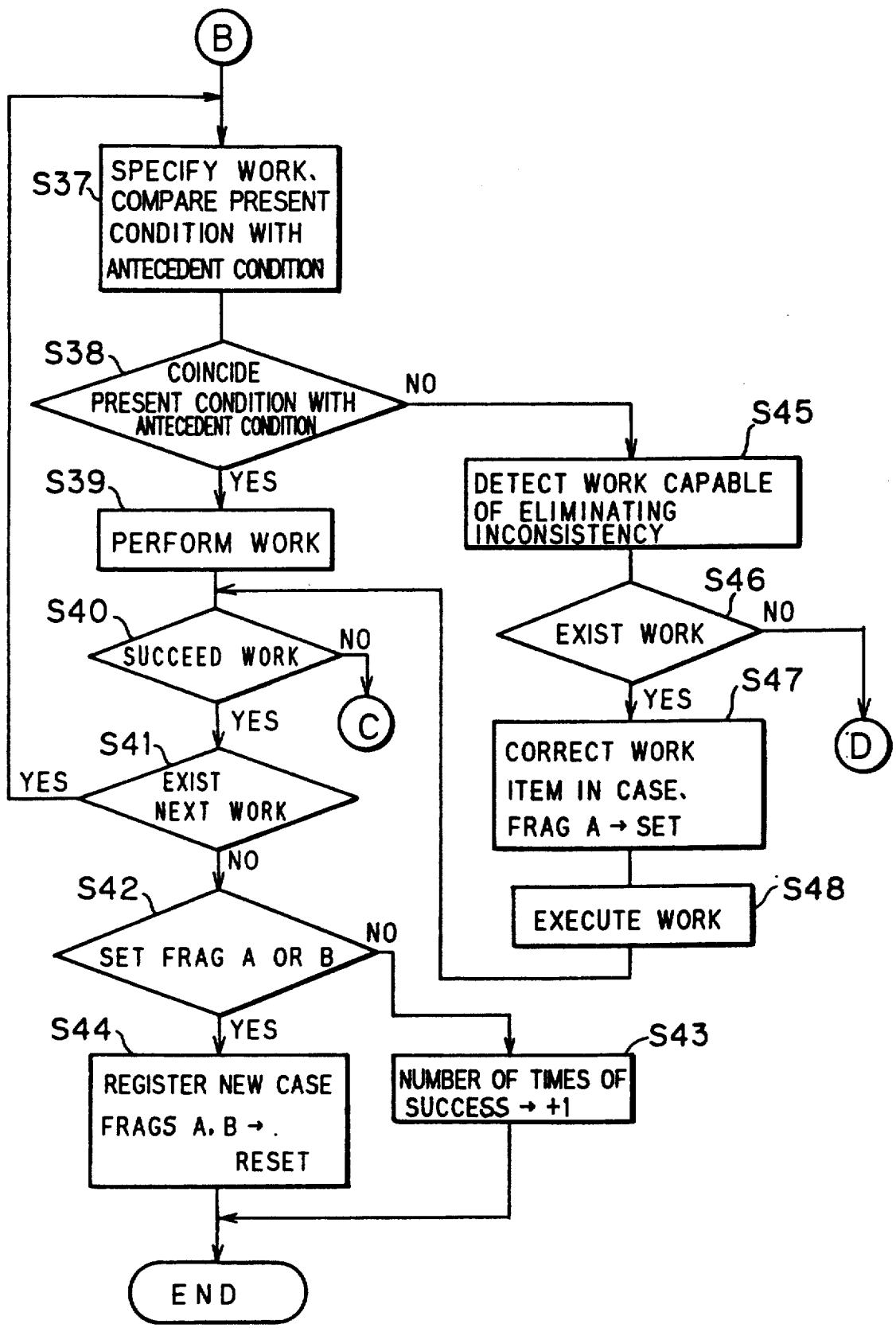
Figure 8C:
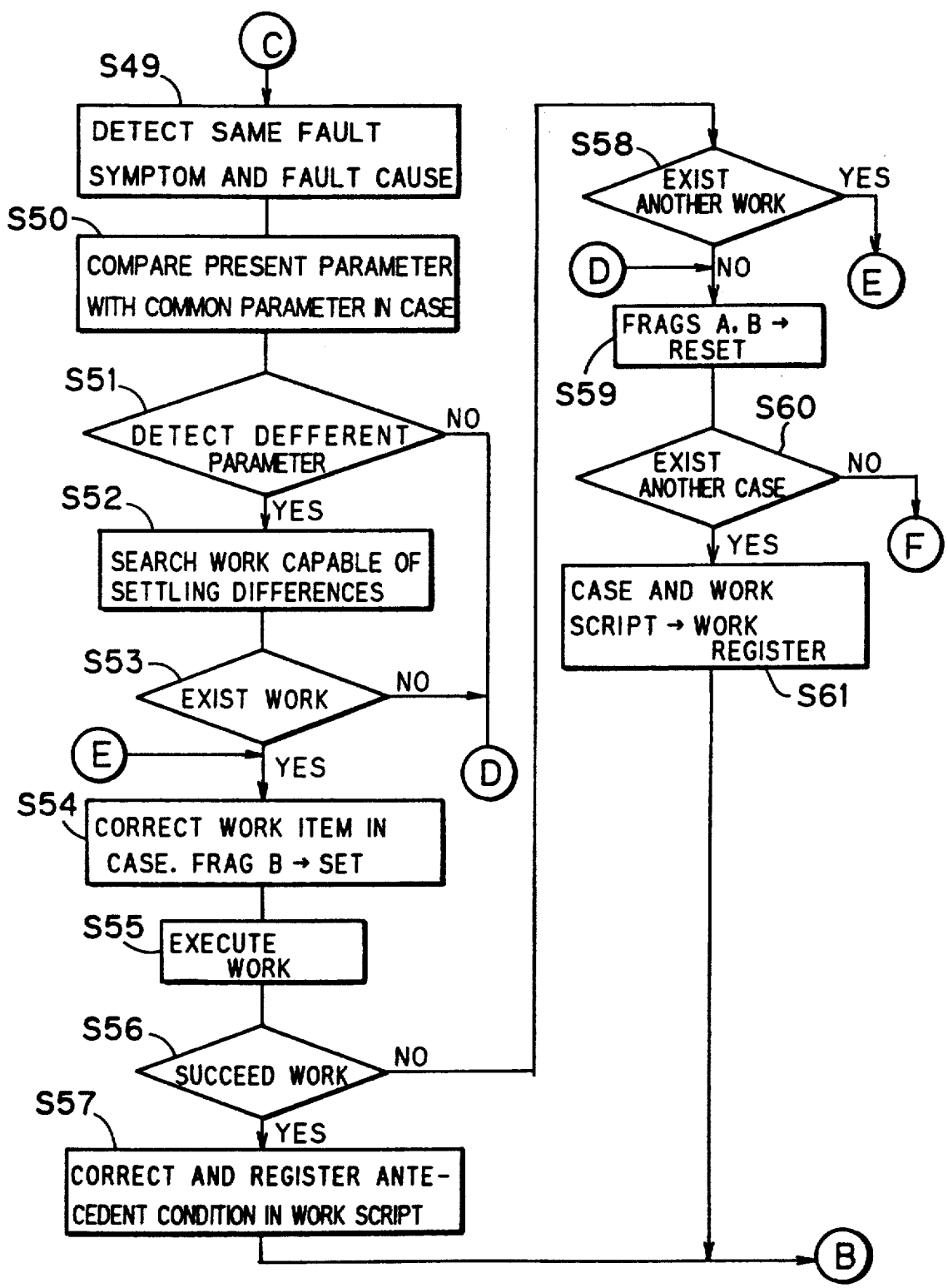

Then, repair work is performed on the basis of the results of fault diagnosis in accordance with flow charts of FIGS. 8A, 8B and 8C on the basis of the results of fault diagnosis made in the fault diagnosis portion 12 and the fault simulation portion 13.

The repair work will be described in sequence in accordance with the flow charts of FIGS. 8A, 8B and 8C.

The flow charts of FIGS. 8A, 8B and 8C correspond to the steps S5, S6, S7 and S8 in the flow chart of FIG. 2, which represent the contents of repair processing specifically and in detail.

Retrieval of case

Inference of the fault which causes the fault symptom which appears is drawn in accordance with the above described method of fault diagnosis (step S21). A lot of cases stored in the case memory portion 17 (see FIG. 1) are retrieved on the basis of the results thereof, and cases which can be utilized for repair are detected therefrom (step S22).

More specifically, the case number, the condition before repair, the condition after repair, the fault symptom, the fault, the repair work, the number of times of success in application and the number of times of failure in application are recorded as shown in Table 3 in each of the cases stored in the case memory portion 17.

TABLE 3

| |
|---|
| case number |
| condition before repair |
| condition after repair |
| fault symptom |
| fault |
| repair work (pointer to work script) |
| number of times of success in application |
| number of times of failure in application |

Furthermore, the cases are hierarchically classified according to the fault symptom and the fault.

The repair plan portion 15 retrieves a case satisfying as indexes both the fault symptom "picture image density too low ($O_s$ = low)" and the fault "improper setting of halogen lamp ($H_L$ = high)" which are diagnosed by the fault diagnosis portion 12 and the fault simulation portion 13. Therefore, a case where the fault symptom is "picture image density low" but the fault is, for example, "improper principal charge voltage" is not detected.

Here, the "fault symptom" means a phenomenon recognized as a malfunction of the objective machine such as "picture image density low" or "picture image fog", and the "fault" means the change in mechanism and structure of the objective machine such as "improper setting of halogen lamp" or "improper principal charge voltage".

As the result of retrieving cases by the fault symptom "picture image density too low" and the fault "improper setting of halogen lamp", it is assumed that cases (1) to (3) shown in the following tables 4 to 6 are detected.

TABLE 4

| case (1) | | | | | |
|---|---|---|---|---|---|
| condition before repair | $H_L =$ | high | $D =$ | normal | $X =$ high |
| | $\beta =$ | normal | $V_n =$ | low | $V_s =$ low |
| | $V_b =$ | normal | $\gamma_O =$ | normal | |
| | $D_s =$ | low | $V_t =$ | normal | |
| | $\xi =$ | normal | $O_s =$ | low | |
| | $A_{sp} =$ | normal | $S_p =$ | low | |
| condition after repair | $H_L =$ | normal | $D =$ | normal | |
| | $X =$ | normal | $\beta =$ | normal | |
| | $V_n =$ | normal | $V_s =$ | normal | |
| | $V_b =$ | normal | $\gamma_O =$ | normal | |
| | $D_s =$ | normal | $V_t =$ | normal | |
| | $\xi =$ | normal | $O_s =$ | normal | |
| | $A_{sp} =$ | normal | $S_p =$ | normal | |
| fault symptom | picture image density low | | | | |
| fault | improper setting of halogen lamp | | | | |
| repair work | 1 | | | | |
| Number of times of success in application | 3 | | | | |
| number of times of failure in application | 1 | | | | |

TABLE 5

| case (2) | | | | | |
|---|---|---|---|---|---|
| condition before repair | $H_L =$ | high | $D =$ | normal | $X =$ high |
| | $\beta =$ | normal | $V_n =$ | low | $V_s =$ low |
| | $V_b =$ | normal | $\gamma_O =$ | normal | |
| | $D_s =$ | low | $V_t =$ | low | |
| | $\xi =$ | normal | $O_s =$ | low | |
| | $A_{sp} =$ | normal | $S_p =$ | low | |
| condition after repair | $H_L =$ | normal | $D =$ | normal | |
| | $X =$ | normal | $\beta =$ | normal | |
| | $V_n =$ | normal | $V_s =$ | normal | |
| | $V_b =$ | normal | $\gamma_O =$ | normal | |
| | $D_s =$ | normal | $V_t =$ | normal | |
| | $\xi =$ | normal | $O_s =$ | normal | |
| | $A_{sp} =$ | normal | $S_p =$ | normal | |
| fault symptom | picture image density low | | | | |
| fault | improper setting of halogen lamp | | | | |
| repair work | 1, 2 | | | | |
| number of times of success in application | 1 | | | | |
| number of times of failure in application | 0 | | | | |

TABLE 6

|  | case (3) | | | | | |
|---|---|---|---|---|---|---|
| condition before repair | $H_L =$ high $\beta =$ normal $V_b =$ high $D_s =$ low $\xi =$ normal $A_{sp} =$ normal | $D =$ normal $V_n =$ low $\gamma_O =$ normal $V_t =$ low $O_s =$ low $S_p =$ low | $X =$ high $V_s =$ low | | | |
| condition after repair | $H_L =$ normal $X =$ normal $V_n =$ normal $V_b =$ normal $D_s =$ normal $\xi =$ normal $A_{sp} =$ normal | $D =$ normal $\beta =$ normal $V_s =$ normal $\gamma_O =$ normal $V_t =$ normal $O_s =$ normal $S_p =$ normal | | | | |
| fault symptom | picture image density low | | | | | |
| fault | improper setting of halogen lamp | | | | | |
| repair work | 2, 3, 7 | | | | | |
| number of times of success in application | 2 | | | | | |
| number of times of failure in application | 1 | | | | | |

Meanwhile, there are plurality of (three in this case) cases detected. Accordingly, it is necessary to determine which of the cases is first applied to the repair work.

Priority is assigned to the three cases (1) to (3) detected (steps S23 to S25). The condition of parameters before repair in each of the cases is compared with the present condition parameters of the objective machine simulated in the fault diagnosis (see Table 2) (step S23). The priority concerning the order of application is assigned in descending order of the number of parameters whose states coincide with each other.

More specifically, if the condition of parameters before repair in each of the cases (1) to (3) is compared with the present condition of parameters (see Table 2), only the state of $V_n$ differs in the case (1), the states of $V_n$ and $V_t$ differ in the case (2), and the states of $V_n$, $V_b$ and $V_t$ differ in the case (3).

Consequently, priority concerning the order of application is assigned in the order of the case (1), the case (2) and the case (3).

If the numbers of times of coincidence of the conditions of parameters before repair in the respective cases and the present condition of parameters are equal, the numbers of times of success in application are considered (step S24). Higher priority is assigned to a case where the number of times of success in application is larger.

Furthermore, in the respective cases, if the numbers of times of coincidence of the conditions of parameters before repair and the present condition of parameters are equal and the numbers of times of success in application are the same, the numbers of times of failure in application are considered (step S24). Higher priority is assigned to a case where the number of times of failure in application is smaller.

Meanwhile, if only one case is detected in the step S22, it is needless to say that the above described assignment of priority concerning the order of application is omitted.

Application of case

A repair plan based on the first priority case (when only one case is detected, the detected case) is carried out.

In carrying out the repair plan, the case (1) assigned the first priority is set in, for example, a work register, and a work script of the fault "improper setting of halogen lamp" is selected out of work scripts stored in the work script memory portion 18 on the basis of the case (1) and set in the work register (step S26).

An example of the work script of the fault "improper setting of halogen lamp" is shown in Table 7.

TABLE 7

| work script | | improper setting of halogen lamp | |
|---|---|---|---|
| No | state of antecedent | operation of antecedent | condition of consequent |
| 1 | $H_L =$ high | AVR → down | $H_L =$ normal |
| 2 | $V_t =$ low | VR1 → up | $V_n =$ normal |
| 3 | $V_t =$ high | VR2 → down | $V_t =$ normal |
| 4 | $H_L =$ normal | VR1 → down | $V_t =$ low |
| 5 | $V_n =$ normal | VR1 → down | $V_n =$ low |
| . | . | . | . |
| . | . | . | . |

As shown in Table 7, in the work script, the fault "improper setting of halogen lamp" to be an index is mentioned, and work 1, 2, 3, . . . is listed. Each work is described in the rule form, which comprises the condition of an antecedent, the operation of an antecedent and the condition of a consequent. In each work, the condition of a consequent is obtained if the operation of an antecedent is performed under the condition of an antecedent.

More specifically, in the case of, for example, the work 1, the condition of the antecedent is the state of a parameter HL=high. In this state, the operation of the antecedent of lowering the lamp volume AVR is performed, thereby to obtain the change in parameter to $H_L$=normal, that is, the condition of the consequent.

Meanwhile, the work script is set for each fault and work serving as the smallest unit is listed in the work script. Since the work script is set for each fault, work scripts which are equal in number to faults exist.

When the case (1) and the work script shown in Table 7 are set in the work register (step S26), the repair plan portion 15 confirms whether or not the condition of parameters before repair in the case (1) set in the register completely coincides with the present condition of parameters (step S27).

If the condition of parameters before repair in the case (1) completely coincides with the present condition of parameters, work given the number mentioned in the item of repair work in the case (1) is selected from the work script of "improper setting of halogen lamp" and performed (step S28) (Actually, the condition of parameters before repair in the case (1) do not completely coincide with the present condition of parameters shown in Table 2. Accordingly, the actual processing proceeds from the step S27 to the step S34, as described later).

If the condition of a consequent is obtained as the result of performing work, it is judged that the work succeeded (YES in step S29). Further, it is judged whether or not the next work exists (step S30). If the number of the next work exists in the item of repair work, the following processing is repeated: the work is selected from the work script and performed (step S28), and it is judged whether or not the work succeeded (step S29).

If the next work does not exist (NO in step S30), the number of times of success in application in the case is increased by one and the number of times of success is registered (step S31).

If the condition of a consequent is not obtained as the result of performing work, it is judged that the work failed (NO in step S29), and the number of times of failure in application is increased by one and the number of times of failure is registered (step S32).

It is judged whether or not the next priority case exists (step S33). If the case exists (YES in step S33), the processing of the step S26 and the following steps is performed for the next priority case.

If the next priority case does not exist (NO in step S33), inference in the repair plan considering the secondary effects as described later, that is, QMS processing is performed (step S34).

Then, it is judged whether or not the QMS processing succeeded (step S35). If it is judged that the QMS processing succeeded (YES in step S35), a new case is created on the basis of data obtained by the QMS processing, and the case is registered in the case memory portion 17 (step S36). Thus, the processing is terminated.

When the QMS processing failed (NO in step S35), a new case is not registered, so that the processing is terminated.

Meanwhile, as described above, the condition of parameters before repair in the case (1) does not completely coincide with the present condition of parameters in that the states of a parameter $V_n$ do not coincide with each other. Accordingly, it is judged in the step S27 that the inquiry is answered in the negative, so that the actual processing proceeds to the step S37 shown in FIG. 8B. In the step S37, work given the number mentioned in the item of repair work in the case (1) is specified from the work script of "improper setting of halogen lamp". That is, the work 1 is specified. The condition of the antecedent in the work 1 is compared with the present condition of parameters, to judge whether or not both coincide with each other (step S38).

In performing work, the present condition of the parameters must coincide with the condition of the antecedent in the work. In this concrete example, a parameter $H_L$ = high is obtained in both the condition of the antecedent in the work 1 and the present condition of parameters. Accordingly, the condition of the antecedent coincides with the present condition of parameters. If both coincide with each other (YES in step S38), the work 1 is performed (step S39). Then, it is judged whether or not the work succeeded (step S40). As the result of the execution of the work, if the condition of the consequent is obtained, it is judged that the work succeeded (YES in step S40).

Furthermore, it is judged whether or not the next work exists depending on whether or not the number of the next work is mentioned in the item of repair work in the case (1) (step S41). If the next work exists (YES in step S41), the next work is specified, and the condition of the antecedent of the work is compared with the present condition of parameters (step S37), and the processing of the step S38 and the following steps is repeated in the same manner as described above.

If the next work does not exist (NO in step S40), the state of a flag A or B (what are the flags A and B for will be described later) is judged (step S42). If neither one of the flags A and B is set (NO in step S42), the numerical value in the item of the number of times of success of application in the case (1) is increase by one and the number of times of success is registered (step S43), to terminate the processing.

However, in the step S39, if the parameter $H_L$ is not changed to "normal" even if the lamp volume AVR is lowered which is an operation of an antecedent and the parameter $H_L$=normal is not obtained as the condition of a consequent even if the lamp volume AVR is lowered to its lower limit value, it is judged that the work failed (NO in step S40).

In other words, if the condition of parameters as the result of the execution of certain work (the present condition of parameters after the work) is not the condition of parameters set in repair work (the condition of a consequent), it is judged that the work failed.

On this occasion, work for avoiding the cause of the failure in work as described below along the flow of FIG. 8C is performed.

More specifically, all cases where the fault symptom is "picture image density too low ($0_s$=low)" and the fault is "improper setting of halogen lamp ($H_L$=high)" are retrieved, and all cases where the number of work which is judged to be a failure, for example, the number of the work 1 is mentioned in the item of repair work are detected from the above all cases (step S49). The conditions of parameters before repair in all the cases are respectively compared with the present condition of parameters 9step S50), to detect parameters, which are common to all the cases, different from parameters in the present condition of parameters. That is, the difference between the condition of parameters before repair which is common to all the cases and the present condition of parameters is detected (step S51).

In the concrete example, cases where the work 1 is mentioned in the item of repair work are cases (1) and (2). Accordingly, the conditions of parameters before repair in the cases (1) and (2) are respectively compared with the present condition of parameters, to take up a parameter $V_n$, which is common to both the cases, different from parameters in the present condition of parameters. That is, $V_n$=low, which is common to both the cases, in the conditions of parameters before repair, while $V_n$=normal in the present condition of parameters.

If it is judged that there is a parameter which differs in state (YES in step S51), it is assumed that the parameter, that is, the parameter $V_n$=normal in the concrete example is the cause of the failure in the work performed this time, and work capable of changing this parameter $V_n$ from "normal" to "low" is searched for from the work script (step S52), and it is judged whether or not the work exists (step S53).

The work script in Table 7 shows that the parameter $V_n$ can be changed from "normal" to "low" by the work 5. Accordingly, it is judged that the work exists (YES in step S53).

In this case, the item of work in the case (1) is temporarily corrected and work 5 is inserted thereinto. In addition, the flag B is set so as to indicate that this temporary correction is made (step S54). Then, the work 5 is executed (step S55).

If $V_n$=low is obtained as the result of the execution of the work 5, it is judged that the work succeeded (YES in step S56).

In this case, $V_n$=low is the condition indispensable for the condition of the consequent in the work 1. Accordingly, such correction is made that $V_n$=low is added to the condition of the antecedent in the work 1 in the work script shown in Table 7, and the work script shown in Table 7 is reloaded with that shown in table 8 (step S57).

In the work script shown in Table 8, the condition of the antecedent in the work 1 is "$H_L$=high and $V_n$=low".

TABLE 8

| | work script | improper setting of halogen lamp | |
|---|---|---|---|
| No | state of antecedent | operation of antecedent | condition of consequent |
| 1 | $H_L$ = high $V_n$ = low | AVR → down | $H_L$ = normal |
| 2 | $V_t$ = low | VR1 → up | $V_n$ = normal |
| 3 | $V_t$ = high | VR2 → down | $V_t$ = normal |
| 4 | $H_L$ = normal | VR1 → down | $V_t$ = low |
| 5 | $V_n$ = normal | VR1 → down | $V_n$ = low |
| . | . | . | . |

Then, the processing of the step S37 and the following steps shown in FIG. 8B is performed again. In this concrete example, the work 1 is performed. If the work succeeded (YES in step S40), there is no work to be further performed (NO in step S41), and it is judged that the flag B is set (YES in step S42). Therefore, a case (1-1) is newly created and registered on the basis of the condition of parameters and the processing at that time. In addition, the flags A and B are reset (step S44). This new case (1-1) is shown in Table 9.

TABLE 9

| | case (1-1) | | | | | |
|---|---|---|---|---|---|---|
| condition before repair | $H_L$ = | high | D = | normal | X = | high |
| | $\beta$ = | normal | $V_n$ = | normal | | |
| | $V_s$ = | low | $V_b$ = | normal | | |
| | $\gamma_O$ = | normal | $D_s$ = | low | | |
| | $V_t$ = | normal | $\xi$ = | normal | | |
| | $O_s$ = | low | $A_{sp}$ = | normal | | |
| | $S_p$ = | low | | | | |
| condition after repair | $H_L$ = | normal | D = | normal | | |
| | X = | normal | $\beta$ = | normal | | |
| | $V_n$ = | normal | $V_s$ = | normal | | |
| | $V_b$ = | normal | $\gamma_O$ = | normal | | |
| | $D_s$ = | normal | $V_t$ = | normal | | |
| | $\xi$ = | normal | $O_s$ = | normal | | |
| | $A_{sp}$ = | normal | $S_p$ = | normal | | |
| fault symptom | | picture image density low | | | | |
| fault | | improper setting of halogen lamp | | | | |
| repair work | | 5, 1 | | | | |
| number of times of success in application | | 1 | | | | |
| number of times of failure in application | | 0 | | | | |

The case (1-1) shown in Table 9 differs from the case (1) shown in Table 4 in that a parameter $V_n$=normal in the conditions of parameters before repair and two work, i.e., "5, 1" are set out in the item of repair work. The number of times of success in application in the case (1-1) is 1 because only work performed this time succeeded, and the number of times of failure in application is 0.

If it is judged that the work did not succeed in the step S56 shown in FIG. 8C, it is judged whether or not work capable of changing the parameter $V_n$ from "normal" to "low" exists in the work script (step S58). If the work exists, the processing of the step S54 and the following steps is performed.

On the other hand, if it is judged in the step S51 that there is no parameter which differs in state or it is judged in the step S53 that there is no work, the flags A and B are reset (step S59) and then, it is judged whether or not another case, that is, a case assigned the next priority for application exists (step S60).

If the next case exists (YES in step 60), the case and a corresponding work script are set in the work register (step S61), and the processing of the step S37 and the following steps shown in FIG. 8B is performed.

On the other hand, it is judged in the step S60 that the case assigned the next priority for application does not exist (NO in step S60), the processing proceeds to the step S34 shown in FIG. 8A. In the step S34, QMS processing is performed.

Let's consider a case where the repair plan based on the case (1) failed and a repair plan based on the case assigned the next priority for application, that is, the case (2) is carried out in the above described concrete example.

In this case, in the step S61, the case (2) and a work script of the fault "improper setting of halogen lamp" selected corresponding to the case (2) are set in the work register.

Then, the work 1 in the work script is specified by "1" set out in the item of repair work in the case (2) and the condition of the antecedent in the work 1 is compared with the present condition of parameters (step S37), to judge whether or not both coincide with each other (step S38). As obvious from the comparison between Table 7 and Table 2, the condition of the antecedent in the work 1 and the present condition of parameters coincide with each other in terms of a parameter $H_L$=high. Accordingly, the work 1 is performed (step S39).

If the parameter $H_L$ is changed to "normal", it is judged that the work succeeded (YES in step S40), and it is judged whether or not the next work exists (step S41).

In the case (2), the work 2 exists as the next work. Accordingly, the processing proceeds to the step S37. In the step S37, the next work 2 is specified and the condition of the antecedent in the work 2 and the present condition of parameters are compared with each other. As a result, the condition of the antecedent in the work 2, i.e., $V_t$=low does not coincide with the present condition of parameters, i.e., $V_t$=normal (NO in step S38).

As described above, in performing work, the present condition of parameters must coincide with the condition of the antecedent in the work. Accordingly, it is judged whether or not another work capable of causing the present condition of parameters to coincide with the condition of the antecedent exists in the work script shown in Table 7 (step S45).

Table 7 shows that the parameter $V_t$ can be changed to "low" by the work 4 when $H_L$=normal. Accordingly, it is judged in the step S46 that the inquiry is answered in the affirmative, so that the processing proceeds to the step S47. The item of repair work in the case (2) is temporarily corrected to "1, 4, 2", and the flag A is set so as to indicate that the temporary correction is made (step S47).

Then, the work 4 added by the temporary correction is executed (step S48), and it is judged whether or not the work 4 succeeded (step S40).

If the execution of this work 4 succeeded (YES in step S40), it is judged whether or not the next work exists (step S41). In the case (2), the work 2 exists as the next work. Accordingly, the processing proceeded to the step S37 again. In the step S37, the next work 2 is specified and the condition of the antecedent in the work 2 and the present condition of parameters are compared with each other. As a result, the present condition of parameters becomes $V_t$=low by the execution of the work 4 in the above described step S48, which coincides with the condition of the antecedent in the work 2.

Accordingly, it is judged in the step S38 that the inquiry is answered in the affirmative, so that the work 2 is performed (step S39).

It is judged whether or not the execution of the work 2 succeeded (step S40). If it succeeded, it is judged in the step S41 whether or not the next work exists.

In the case (2), the next work does not exist. Accordingly, the processing proceeds to the step S42. Then, it is judged that the flag A is set (YES in step S42), and a case where the item of repair work is temporarily corrected in the step S47 is registered as a new case (2-1) (step S44). In addition, the flags A and B are reset (step S44).

This case (2-1) added and registered is shown in Table 10.

The case (2-1) shown in Table 10 differs from the case (2) shown in Table 5 in that a parameter $V_n$=normal in the condition before repair and repair work is "1, 4, 2". Further, the number of times of success in application is 1 because only work performed this time succeeded, and the number of times of failure in application is 0.

TABLE 10

| | case (2-1) | | | | | |
|---|---|---|---|---|---|---|
| condition before repair | $H_L$ = | high | $D$ = | normal | $X$ = | high |
| | $\beta$ = | normal | $V_n$ = | normal | | |
| | $V_s$ = | low | $V_b$ = | normal | | |
| | $\gamma_O$ = | normal | $D_s$ = | low | | |
| | $V_t$ = | normal | $\xi$ = | normal | | |
| | $O_s$ = | low | $A_{sp}$ = | normal | | |
| | $S_p$ = | low | | | | |
| condition after repair | $H_L$ = | normal | $D$ = | normal | | |
| | $X$ = | normal | $\beta$ = | normal | | |
| | $V_n$ = | normal | $V_s$ = | normal | | |
| | $V_b$ = | normal | $\gamma_O$ = | normal | | |
| | $D_s$ = | normal | $V_t$ = | normal | | |
| | $\xi$ = | normal | $O_s$ = | normal | | |
| | $A_{sp}$ = | normal | $S_p$ = | normal | | |
| fault symptom | picture image density low | | | | | |
| fault | improper setting of halogen lamp | | | | | |
| repair work | 1, 4, 2 | | | | | |
| number of times of success in application | 1 | | | | | |
| number of times of failure in application | 0 | | | | | |

If it is judged in the step S46 that another work capable of causing the present condition of parameters to coincide with the condition of the antecedent therein does not exist (NO in step S46), the processing proceeds to the step S59 shown in FIG. 8C.

In performing the repair work, the use of the above described method of retrieving and applying cases is particularly effective for an apparatus such as a small-sized plain paper copier as described in the above described concrete example.

The reason for this is that the apparatus represented by the small-sized plain paper copier has in its composition system unstable elements (for example, active utilization of the chemical change) as a control object. Therefore, the relationships between parameters of sensors and between parameters of actuators may be changed depending on the change of the state where the composition system is placed, for example, the change in environment or the structural degradation. The cases are retrieved in the above described concrete example in such a manner that the apparatus collects such changes between the parameters during running, one type of study using the changes is conducted and knowledge is tuned. Accordingly, even if the above described change between the parameters occurs, repair work which effectively copes with the change can be performed.

More specifically, when the relationship between the parameters of the objective machine is changed, the case is corrected on the basis of the change and a new case is created. In addition, the contents of the work script are corrected.

In the foregoing description, the cases and the work script are separately stored and separately selected and set.

However, the cases in the above described embodiment can be replaced with cases in which specific work to be performed is stored by storing not the number of work in the work script but the work itself in the item of repair work in each of the cases, for example.

In other words, they can be replaced with cases which are integrated with a work script.

Inference in Repair plan

Inference in the repair plan, that is, QMS processing shown in the step S51 in FIG. 8 will be described.

As the result of the distinction between faults, "picture image density too low ($O_s$=low)" is taken up as the fault symptom. Accordingly, the target of repair is to increase $O_s$.

Inference can be drawn from the relationship on the mathematical model shown in FIG. 4 that $O_s$ can be increased, which is the target of repair, by increasing $D_s$, by increasing $V_t$ or by increasing $\xi$.

Then, when inference is drawn with increasing $D_s$ as the target, any one of such conclusions is obtained that $V_s$ is increased, $V_b$ is decreased and $\gamma_O$ is increased. It is thus possible to obtain on the mathematical model the candidates of the repair operation by repeating the inference on the basis of the mathematical model. The obtained results are shown in Table 11.

TABLE 11

| $H_L$ = | decrease | $V_b$ = | decrease |
|---|---|---|---|
| $D$ = | increase | $\gamma_O$ = | increase |
| $X$ = | decrease | $D_s$ = | increase |
| $\beta$ = | decrease | $V_t$ = | increase |
| $V_n$ = | increase | $\xi$ = | increase |
| $V_s$ = | increase | | |

Now, some repair candidates obtained on the basis of the mathematical model may be realized, whereas others may not be realized. For example, D: Optical density of an original cannot be altered, and $\beta$: Sensitivity of a photosensitive substance is also difficult to be altered.

$\gamma_O$: Sensitivity of toner is neither alterable, and $\xi$: Sensitivity of paper is nor alterable.

Furthermore, in this concrete example, $V_b$: Bias voltage is not alterable because there is no actuator. It is needless to say that $V_b$ is alterable by adding an actuator.

Additionally, the following are not made alterable but are only altered by indirectly altering another parameter and thus, are excluded from the repair candidates:

X: logarithm of copy reflected quantity of light $V_s$: surface potential of drum after exposure $D_s$: toner density on drum.

Meanwhile, the following, which is not directly related in this concrete example, can be altered by adding an actuator:

$A_{sp}$: amplitude of separating AC voltage.

In the above described manner, the following are taken up as the repair candidates in this concrete example:

$V_t$: transfer voltage $V_n$: surface potential after principal charge $H_L$: logarithm of halogen lamp output quantity of light.

On the other hand, the following knowledge is previously stored as the repair plan knowledge in the objective model storage portion 14. That is:

(a) $V_t$ is decreased.→The control voltage of the transfer transformer is increased.

(b) $V_t$ is decreased.→The control voltage of the transfer transformer is decreased.

(c) $V_n$ is increased.→The control voltage of the principal charge transformer is increased.

(d) $V_n$ is decreased.→The control voltage of the principal charge transformer is decreased.

(e) $H_L$ is increased.→The halogen lamp control signal is shifted to the high voltage side.

(f) $H_L$ is decreased.→The halogen lamp control signal is shifted to the low voltage side.

The repair plan knowledge stored in this objective model storage portion 14 is characteristic data intrinsic to this apparatus. By applying the repair plan knowledge to the repair candidates obtained on the basis of the mathematical model, the following three methods are obtained as the repair operation for increasing $O_s$:

(a) $V_t$ is increased.→The control voltage of the transfer transformer is increased.

(b) Vn is increased.→The control voltage of the charge transformer is increased.

(c) $H_L$ is decreased.→The halogen lamp control signal is shifted to the low voltage side.

If it is necessary only to increase the picture image density $O_s$, repair is possible by carrying out any one of the three methods.

It is considered, however, that the objective machine is subjected to a variety of secondary effects by increasing the picture image density $O_s$. In the present embodiment, therefore, inference of the secondary effects is drawn on the basis of the mathematical model as described below.

Inference of secondary effects

Figure 9:
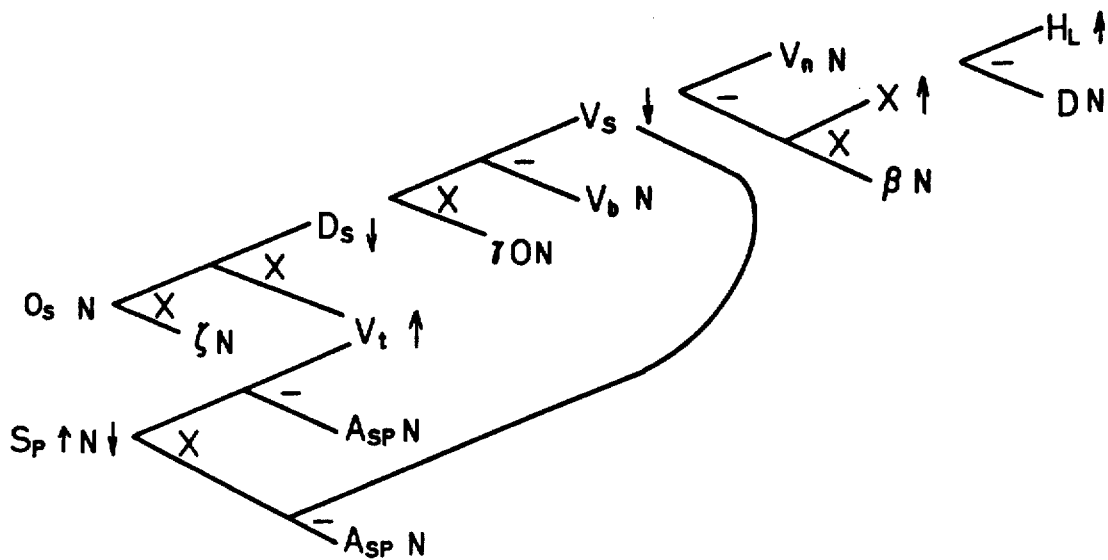
FIGS. 9 to 14 are diagrams showing development on the mathematical model for inference of secondary effects.
Figure 10:
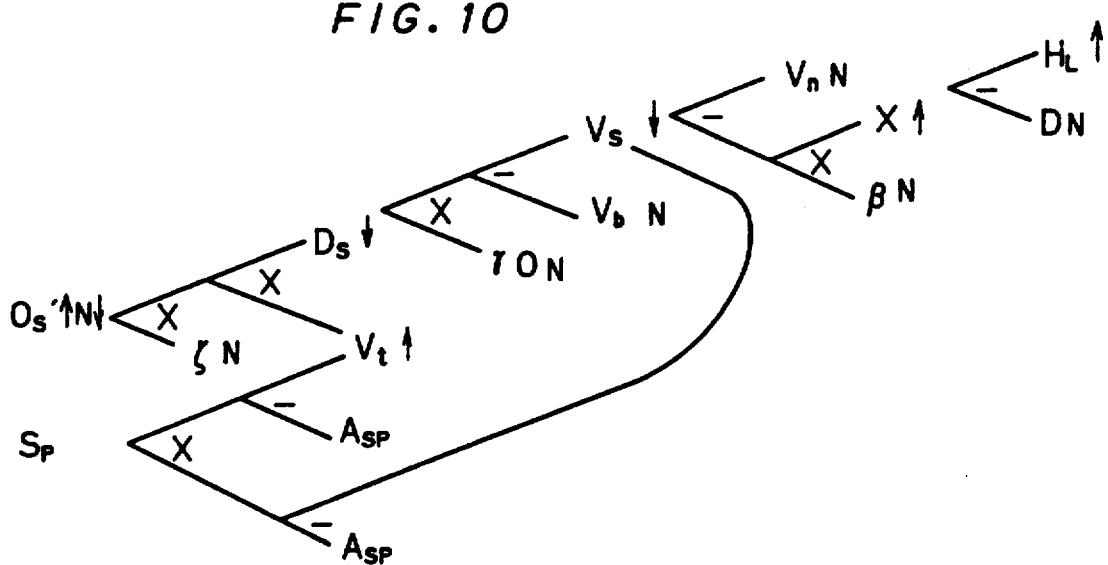
Figure 11:
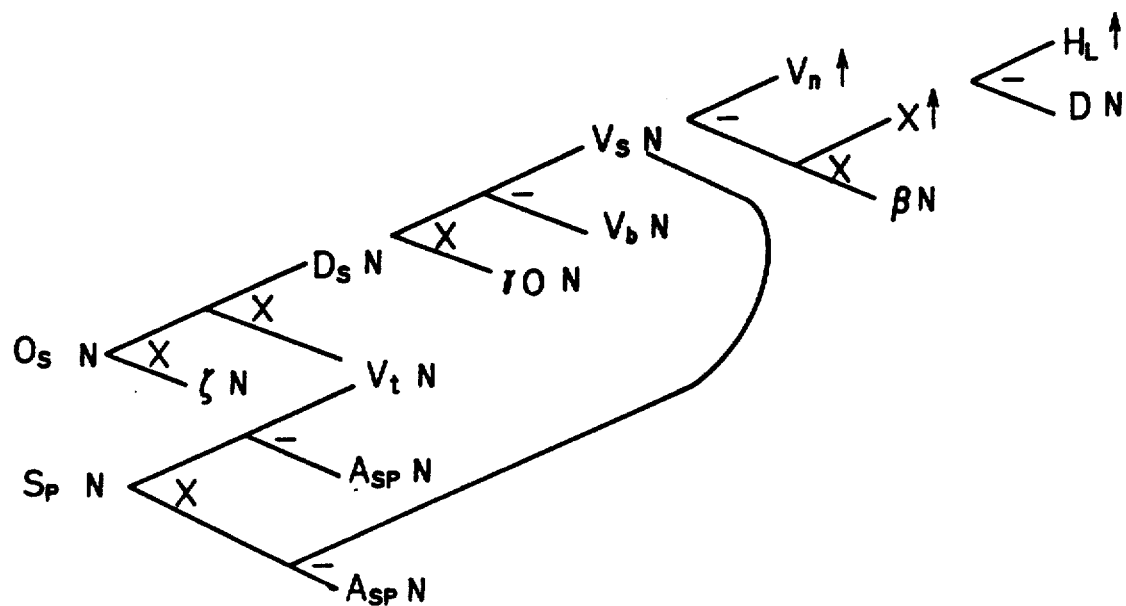
Figure 12:
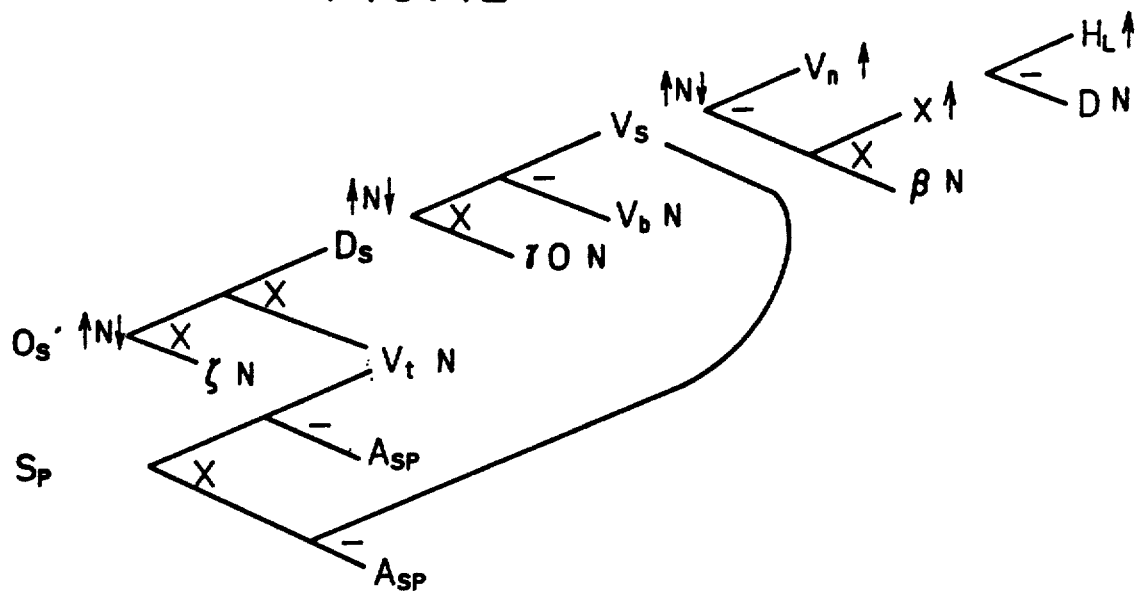
Figure 13:
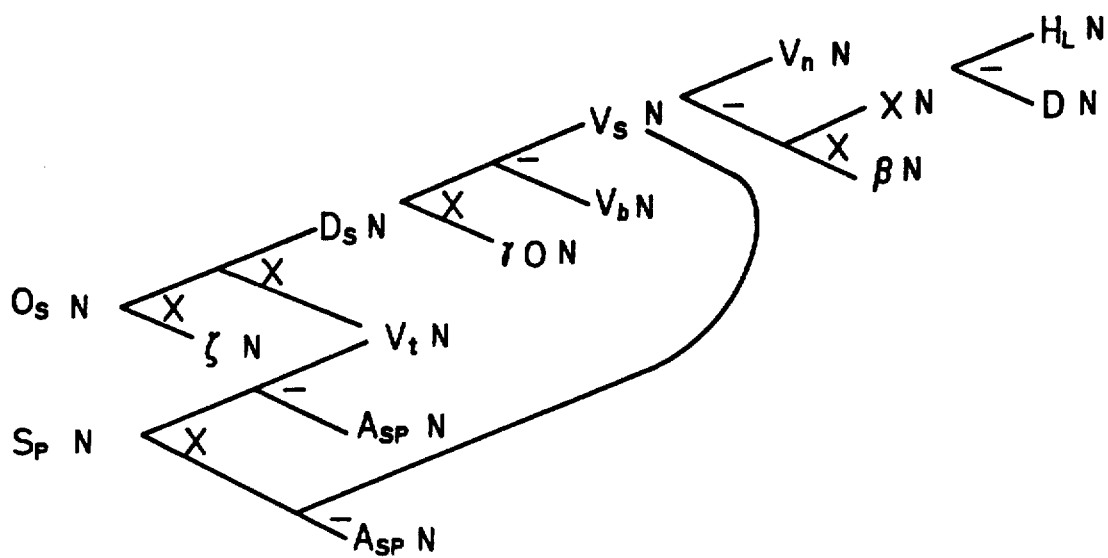
Figure 14:
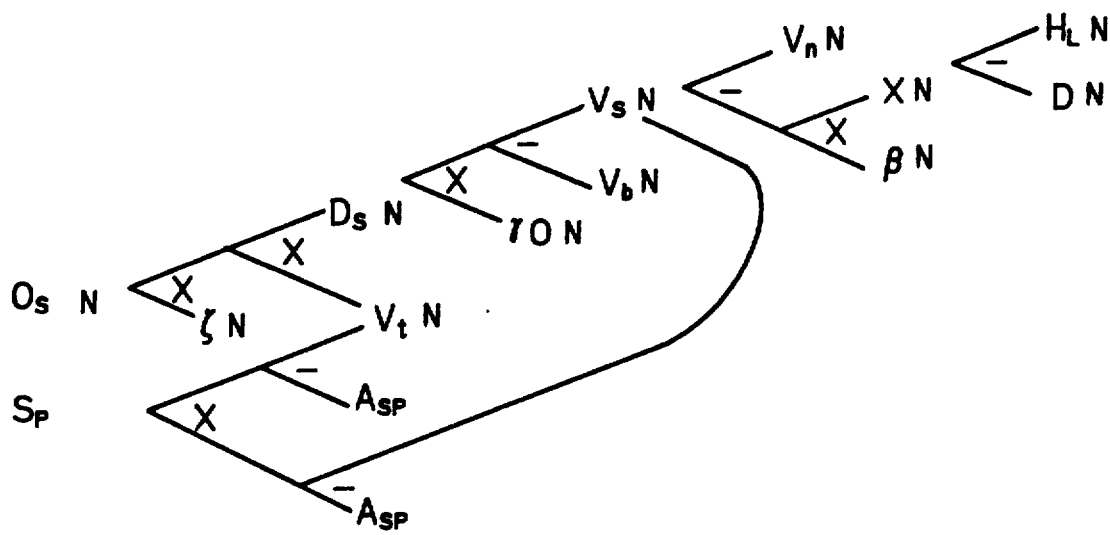

FIGS. 9 to 14 are obtained when three repair plans derived in the inference in the repair plan are developed on the mathematical models. That is, the case (a) where $V_t$ is increased is shown in FIGS. 9 and 10 ($O_s'$ when D=0 is shown on the mathematical model in FIG. 10), and the case (c) where $V_n$ is increased is shown in FIGS. 11 and 12 ($O_s'$ when D=0 is shown on the mathematical model in FIG. 12), and a case (f) where $H_L$ is decreased is shown in FIGS. 13 and 14 ($O_s'$ when D=0 is shown on the mathematical model in FIG. 14).

When function evaluations are carried out on the basis of the mathematical models, inference is drawn on the following states. That is;

(1) When $V_t$ is increased (FIGS. 9 and 10)
 (a) The output picture image density is increased.
 (b) In some cases, $O_s'$>normal is created when D=0. That is, there is a possibility that fog is generated.
 (c) There is a possibility that $S_p$>normal is created and defective separation is performed.

(2) When $V_n$ is increased (FIGS. 11 and 12).
 (a) The output picture image density is increased.
 (b) $O_s'$>normal is created when D=0, and there is a possibility that fog is generated.

(3) When $H_L$ is decreased (FIGS. 13 and 14)
 (a) The output picture image density is only increased, and there is no other secondary effects.

Therefore, in the repair plan portion 15, the repair plan which is subjected to the least secondary effects, that is, to decrease $H_L$ is selected. This repair plan coincides with an operation for eliminating a fault obtained in fault diagnosis.

More specifically, from another point of view, inference of the fault in the fault diagnosis is drawn by tracing on the mathematical model the actual state of the apparatus which failed and grasping the states of respective elements in a case where the apparatus failed. while inference in the repair plan is drawn by tracing on the mathematical model the state of the apparatus on the assumption that the apparatus is not fault but normal and on the basis of the tracing.

In the above described concrete example, both the inference in the fault diagnosis and the inference in the repair plan result in the same fault and repair plan.

However, the results obtained by both the inference in the fault diagnosis and the inference in the repair plan may, in some cases, differ from each other because the former is based on the assumption that the apparatus is in the fault state, while the latter is based on the assumption that the apparatus is in the normal state. In such cases, only a conclusion which is not contradictory to the conclusion obtained in the process of the inference in the fault diagnosis may be selected at the time of the inference in the repair plan to perform the inference processing in the repair plan in a shorter time period.

In the above described case, when the repair plan to decrease $V_n$ cannot be selected, for example, when the volume AVR for shifting the halogen lamp control signal to the low voltage side is already at the lowest limit, the repair plan (2) which is subjected to the next least secondary effects, that is, to increase Vn is selected.

If the repair plan to increase $V_n$ is selected, however, a secondary effect of the possibility of fog generation is forecast. Accordingly, if is examined on the basis of the mathematical model shown in FIG. 12 which parameter is to be operated so as to decrease $O_{s'}$, and an operation is selected on the basis of the repair plan knowledge. As a result, the following is selected:
whether $H_L$ is increased,
whether $V_n$ is decreased, or
whether $V_t$ is decreased,
and a repair plan including prevention of fog generation is carried out.

Figure 15:
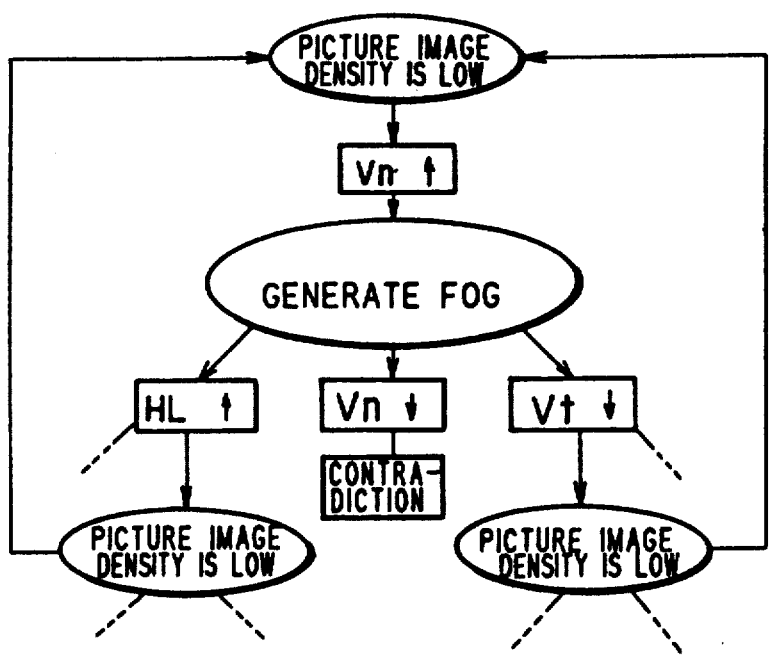
FIG. 15 is a diagram showing an operation in selecting repair plans.

More specifically, inference of a repair operation is developed by assuming secondary effects as shown in FIG. 15. The development of the inference of the repair operation as shown in FIG. 15 is made on the basis of the following knowledge:

(a) Any branch which is contradictory to the previous repair plan on the mathematical model is not selected.

(b) That which is subjected to the least secondary effects is selected.

(c) That which has formed a loop stops being developed at that time point.

In FIG. 15, the following two repair plans are eventually left:

(1) a loop of $V_n \uparrow \rightarrow H_L \downarrow \rightarrow V_n \uparrow$, and
(2) a loop of $V_n \uparrow \rightarrow V_t \downarrow \rightarrow V_n \uparrow$.

Figure 16:
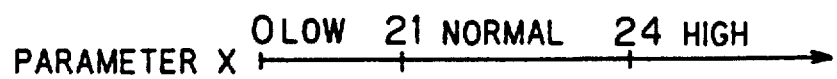
FIG. 16 is a diagram showing reference value data after renewal.
Figure 16:
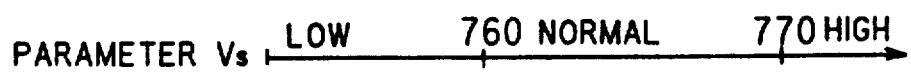
Figure 16:
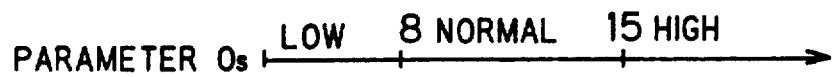
Figure 16:
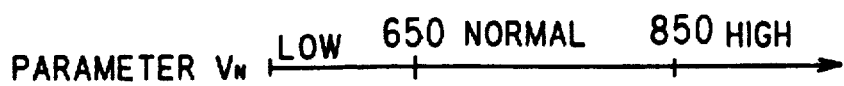

In a case where the loop (1) is executed as a repair plan, it is assumed that the picture image density becomes proper, that is, $O_s$ becomes "normal". In such a case, parameters $V_n$ and $H_L$ are increased. Accordingly, in a state before repair where the picture image density $O_s$ is returned to "normal", the value of the surface potential measured by the sensor 1b should be changed to a value significantly higher that the value first measured. Since this means that the repair work succeeded, however, a parameter $V_s$ in a state after repair must be symbolized to "normal". In such a case, therefore, reference data for symbolizing the parameter $V_s$ shown in FIG. 5 is altered on the basis of the value measured by the sensor 1b at the time point where the repair is terminated, and is reloaded with data shown in, for example, FIG. 16.

Thus, the reference data is renewed as required after the repair work is terminated.

In the present embodiment, when the above described loop (1) in FIG. 14 is executed, and specifically, the principal charge volume VR1 is operated to raise the surface potential of the photosensitive drum 21 so that fog is generated in a copy thus obtained, the lamp volume AVR is operated to increase the quantity of light of the halogen lamp so that the picture image density of the copy is decreased.

When the picture image density becomes normal, that is, when it is found from a detection output of the densitometer which is the sensor 1c that the parameter $O_s$ becomes "normal" while alternately increasing the principal charge volume VR1 and the lamp volume AVR, the repair processing is terminated.

Furthermore, if the above described two repair plans are impractical, the above described repair plan (3) to increase $V_t$ is further selected, and fault diagnosis assuming fog generation and defective separation which are its secondary effects is made, thus selecting the repair plan.

Then, if the selected repair plan is carried out, and in the case of loop processing, judgement is made to be a failure when the operation of parameters on the loop reaches its limit.

Additionally, in the present embodiment, the termination of the repair is determined when $O_s$ becomes "normal", and the repair is stopped in the state.

In the above described inference of the secondary effects, three repair plans derived in the interference in the repair plan are sequentially developed on the mathematical models. The inference of the secondary effects is drawn with respect to the respective repair plans collectively.

Such an inference method of the secondary effects may be replaced with the following processing.

More specifically, in the inference in the repair plan, it is assumed that three repair plans, for example, are derived. In such a case, only one of the three repair plans is taken up to simulate a secondary effect which may be caused when actuator means is operated on the basis of the repair plan, and it is judged whether or not the secondary effect simulated can be removed by operating actuator means other than the actuator means selected by the repair plan.

When it is judged that the secondary effect can be removed, the actuator means selected by the repair plan is actually operated to make repair, and the secondary effect is removed by operating the other actuator means.

As a result, secondary effects based on the other two repair plans derived in the inference in the repair plan need not be simulated, thereby to make it possible to shorten time for the repair operation as a whole.

In the above described case, if the secondary effect is simulated with respect to the repair plan first selected and it is judged that the secondary effect simulated cannot be removed by operating the other actuator means, the first repair plan is abandoned and then, the second repair plan is taken up to simulate a secondary effect which may be caused when actuator means selected on the basis of the second repair plan is operated, and it is judged whether or not the secondary effect simulated can be removed by operating actuator means other than the actuator means. When the secondary effect can be removed, repair work based on the second repair plan is performed.

Thus, a first repair plan out of a plurality of repair plans derived in the inference in the repair plan is taken out, and inference of a secondary effect in the case is drawn. If the secondary effect can be removed, repair based on the first repair plan is immediately made.

If the secondary effect is too large in the repair plan, the repair plan is abandoned, and the next repair plan is selected to simulate a secondary effect in the case.

In such a case, it is preferable to judge which repair plan is to be first selected out of the plurality of repair plans derived in the inference in the repair plan in consideration of, for example, the fault obtained in the fault diagnosis.

In the above described embodiment, repair itself is significantly restricted because the number of parameters of each actuator is small. However, it is possible to further improve the flexibility and the possibility of the repair by increasing the number of parameters of the actuator.

In the above described concrete example, if any repair work succeeded, it is judged that the apparatus after success is in a normal state. Accordingly, it is preferable that reference value data (a reference value shown in FIG. 5) of each parameter is renewed by the value of digital data applied from each sensor and the parameter is symbolized on the basis of new reference value data.

Furthermore, in the above described concrete example, the operation range of each actuator is not particularly referred to. However, the operation range in which an output state of an actuator is stored can be utilized for judgement whether or not repair work is right provided that the operation range data for setting the operation range of the actuator is included in characteristic data intrinsic to the apparatus stored in the objective model storage portion 14. More specifically, it is judged that the actuator is operable when the actuator is within the operation range, while it is judged that the actuator is not operable when the actuator reaches the upper or lower limit of the operation range.

Additionally, although in the above described concrete example, a system of automatically making self-diagnosis and self-repair on the basis of the change of the sensor output is taken up, the image forming apparatus may be provided with a self-diagnosis mode setting key or the like such that self-diagnosis and/or self-repair can be made only when the self-diagnosis mode setting key is operated.

In the foregoing concrete example, description was made by taking up a completely autonomous system, that is, a system of automatically making self-diagnosis of the presence or absence of a fault and making self-repair if a fault exists without any operation of a serviceman and a user. According to the present invention, however, an image forming apparatus capable of making non-autonomous self-diagnosis and making autonomous repair on the basis of the self-diagnosis can be provided by using such construction that data input means is provided instead of eliminating sensors from elements of the apparatus so that a serviceman or the like can measure data in a function state in a predetermined portion of the apparatus and input the data measured from the data input means.

Furthermore, an image forming apparatus having a non-autonomous self-repair system can be provided by using such construction that an actuator for repairing a fault is only selected on the basis of the results of self-diagnosis made by the apparatus and the actuator is not actually operated but the actuator to be operated is displayed so that it is only necessary that a serviceman operates the actuator displayed.

It goes without saying that an image forming apparatus having only a self-diagnosis system can be constructed by eliminating elements of a self-repair system.

More specifically, according to the present invention, the following image forming apparatus can be constructed as required:

(1) An image forming apparatus having completely autonomous self-diagnosis and self-repair systems, (2) An image forming apparatus having an autonomous self-diagnosis system and a non-autonomous self-repair system, (3) An image forming apparatus having a non-autonomous self-diagnosis system and a non-autonomous self-repair system, (4) An image forming apparatus having a non-autonomous self-diagnosis system and an autonomous self-repair system, or (5) An image forming apparatus having only an autonomous self-diagnosis system.

Furthermore, in the present invention, only an actuator which is actually adjustable may be selected in consideration of the adjustable range of the actuator in making inference in the repair plan.

More specifically, if an actuator is, for example, an AVR, the AVR is so constructed that its lower limit value and its upper limit value are respectively "0" and "100" and its set state can be detected by any one of the integers 1 to 100. In addition, the lower limit value "0" and the upper limit value "100" of the AVR are set in the objective model storage portion 14. Consequently, when the AVR is adjusted to enter a certain state, the adjusted state of the AVR is grasped as data of any one of the integers 0 to 100 which corresponds to the adjusted state.

In the repair plan portion 15, the adjusted state of the AVR is grasped by the data of any one of the integers 0 to 100 obtained depending on the adjusted state of the AVR, to judge whether or not the AVR can be selected as an actuator for fault repair. That is, the lower limit value and the upper limit value of the AVR which are stored in the objective model storage portion 14 are compared with the present value of the adjusted state thereof, to judge whether the AVR can be further operated in the direction of the lower limit or in the direction of the upper limit.

Accordingly, the results of the inference in the repair plan are outputted as a combination of actuator means which can be actually operated, thereby to make it possible to make practical inference in the repair plan by using the above described construction for each of a plurality of actuators or an arbitrary actuator therein.

Meanwhile, the above described method of setting the operation range is one example. The operation range may be set by another method and compared with the actual state of an actuator.

Furthermore, the adjustable range and the actual value of the adjusted state of the set actuator are not only compared with each other in the repair plan portion 15 but also may be compared with each other and referred to in making fault diagnosis in the fault diagnosis portion 12.

Additionally, an image forming apparatus according to the present embodiment may be provided with, for example, a self-diagnosis mode setting key or switch which is manually operated as self-diagnosis mode setting means such that the above described self-diagnosis and/or self-repair can be made only when the self-diagnosis mode setting key or switch is operated.

The self-diagnosis mode setting key or switch may be arranged in an arbitrary position, which preferably is provided in a position different from that of an operation key or the like for normal image formation, for example, inside of the image forming apparatus such that it can be operated by opening a front panel provided in the apparatus.

According to the present invention, it is judged whether or not a fault occurs in the image forming apparatus. If a fault occurs, inference of the fault symptom, the fault and the state of the apparatus is drawn. A plurality of cases previously stored are retrieved on the basis of the results of the inference, to detect a case most suitable for fault repair. In addition, the detected case is corrected as required. Fault repair processing based on the case is then performed. In the fault repair processing based on the case, a repair plan is previously registered in the case. Accordingly, inference in the repair plan need not be drawn. Accordingly, there can be provided an image forming apparatus capable of shortening time elapsed until the repair processing is started and making fault diagnosis and fault repair in a shorter time period as a whole.

Furthermore, according to the present invention, the fault is based on qualitative data common to image forming apparatuses. Accordingly, there can be provided an image forming apparatus having a self-diagnosis and self-repair system capable of handling unknown faults which are not clearly expressed.

Additionally, a self-diagnosis and self-repair system according to the present invention can be applied not to a particular image forming apparatus but to a lot of types of image forming apparatuses. As a result, there can be provided an image forming apparatus having a low-cost self-diagnosis and self-repair system.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A self-repairing system for an image-forming apparatus which includes a plurality of interrelated elements, the interrelated elements including actuator elements which control operations carried out by the image-forming apparatus, and sensor means for sensing conditions in the image-forming apparatus and providing condition data indicative thereof, said self-repairing system comprising:
    memory means including:
        a first memory for storing characteristic data representative of various characteristics of the image-forming apparatus, interrelationship knowledge representative of the interrelationships of the elements of the image-forming apparatus, and diagnostic knowledge,
        a second memory for storing repair case knowledge, and
        a third memory for storing repair work script knowledge;
    diagnostic means for determining whether the image-forming apparatus is in a normal or an abnormal condition based upon condition data from the sensor means, the characteristic data from the first memory and the diagnostic knowledge from the first memory; and
    a repair plan inference means, responsive to a determination by the diagnostic means that the image-forming apparatus is in an abnormal condition, for inferring a repair case from the repair case knowledge from the second memory and a work script from the work script knowledge from the third memory to provide a repair plan to select one of the actuator elements for influencing one of the operations in the image-forming apparatus.

2. A self-repairing system as claimed in claim 1, wherein the repair case knowledge is organized into repair cases which each include pre-repair condition data and work index data and the work script knowledge is organized into work scripts which each list a work for influencing an actuator element.

3. A self-repairing system as claimed in claim 2, wherein said self-repairing system comprises conversion means for converting condition data from the sensor means to symbolic data, and wherein the diagnostic means determines the condition of the image-forming apparatus from symbolic data provided by the conversion means, and the diagnostic knowledge from the first memory.

4. A self-repairing system as claimed in claim 3, wherein the diagnostic means comprises:
    means for identifying a fault symptom;
    fault simulation means for identifying a fault cause based upon the interrelationship knowledge and symbolic data from the conversion means; and wherein
    the repair plan inference means selects a repair case based upon a fault symptom identified by the symptom identifying means and a fault cause identified by the fault simulation means.

5. A self-repairing system as claimed in claim 4, wherein the repair plan inference means compares the pre-repair condition data of a selected repair case to the condition data from the sensor means, and work antecedent data associated with a work indicated by the work index data of the selected repair case to the condition data from the sensor means.

6. A self-repairing system as claimed in claim 5, wherein the repair plan inference means infers a different work for influencing one of the actuator elements to change condition data received from the sensor means to be the same as the pre-repair condition data of the work indicated by the selected repair case when the pre-repair condition data of the selected repair case is different from received condition data.

7. A self-repairing system as claimed in claim 6, wherein the repair plan inference means infers a failure cause which causes an indicated work to fail, and thereafter infers corrective work.

8. A self-repairing system as claimed in claim 7, wherein for inferring failure causes and corrective work, the repair plan inference means retrieves all repair cases having pre-repair condition data that are different from some of the received condition data and that are common to all the retrieved cases, and thereafter searches to locate a corrective work in the selected work script to influence an actuator element to cause the different received condition data to become the same as corresponding data in the retrieved cases.

9. A self-repairing system as claimed in claim 8, wherein if the corrective work is successfully executed along with remaining works indicated by the selected repair case, the repair plan inference means infers a new repair case based upon the selected repair case, condition data received before execution of the corrective work, and the corrective work.

10. A self-repairing system as claimed claim 9, wherein the inference engine infers a new work script based upon the condition data received before execution of the corrective work and the corrective work.

11. A self-repairing system as claimed in claim 10, wherein said self-repairing system further comprises updating means for updating certain of the characteristic data based upon symbolic data provided by the conversion means, after the image-forming apparatus has been returned to the normal condition.

12. A self-repairing system as claimed in claim 11, wherein the characteristic data comprises reference value data and the interrelationship knowledge comprises mathematical model knowledge.

13. A self-repairing system as claimed in claim 12, wherein the reference value data represent desired operating ranges for parameters of the elements of the apparatus and wherein the updating means changes an original desired operating range to a new desired operating range if, after the image-forming apparatus has been returned to the normal condition, a parameter falls outside of its original desired operating range.

14. A self-repairing system as claimed in claim 4, wherein the repair plan inference means prioritizes selected repair cases on the basis of the pre-repair condition data thereof and the received condition data.

15. A self-repairing system as claimed in claim 14, wherein the repair plan inference means further prioritizes repair cases on the basis of success rates and failure rates of the cases.

16. A self-repairing system for an image-forming apparatus which includes a plurality of interrelated elements, the interrelated elements including actuator elements which control operations carried out by the image-forming apparatus, and sensor means for sensing conditions in the image-forming apparatus and providing condition data indicative thereof, said self-repairing system comprising:
  memory means including:
    a first memory for storing characteristic data representative of various characteristics of the image-forming apparatus, interrelationship knowledge representative of the interrelationships of the elements of the image-forming apparatus, and diagnostic knowledge,
    a second memory for storing repair case knowledge, and
    a third memory for storing repair work script knowledge,
  diagnostic means for determining whether the image-forming apparatus is in a normal or an abnormal condition based upon condition data from the sensor means, the characteristic data from the first memory and the diagnostic knowledge from the first memory; and
  a repair plan inference means, responsive to a determination by the diagnostic means that the image-forming apparatus is in an abnormal condition, for inferring a first repair plan based upon a repair case from the repair case knowledge from the second memory and a work script from the work script knowledge from the third memory, and a second repair plan in the event that the first repair plan is unsuccessful in returning the image-forming apparatus to the normal condition.

17. A self-repairing system as claimed in claim 16, wherein the repair plan inference means infers the second repair plan based upon a new repair case derived thereby.

18. A self-repairing system as claimed in claim 17, wherein the repair plan inference means infers the second repair plan based upon an inferred fault candidate, simulated fault affects, and inferred secondary affects, and thereafter registers the inferred second repair plan as a new repair case.

19. A self-repairing system as claimed in claim 18, wherein said self-repairing system further comprises updating means for updating the characteristic data based upon received condition data after the image-forming apparatus has been returned to the normal condition.

20. A self-repairing image-forming apparatus comprising:
  interrelated elements including actuator elements which control operations in the image-forming apparatus;
  sensor means for sensing conditions in the image-forming apparatus and providing condition data indicative thereof;
  memory means including a first memory for storing image-forming apparatus characteristic data, interrelationship knowledge, and diagnostic knowledge, a second memory for storing repair case knowledge organized into repair cases, and a third memory for storing repair work script knowledge organized into work scripts;
  diagnostic means for determining whether the image-forming apparatus is in a normal or an abnormal condition based upon condition data from the sensor means, the characteristic data from the first memory and the diagnostic knowledge from the first memory;
  a repair plan inferring means, responsive to a determination by the diagnostic means that the image-forming apparatus is in an abnormal condition, for inferring a repair case to select one of the actuator elements for influencing one of the operations in the image-forming apparatus; and
  actuator control means for controlling an actuator means selected by the inferring of a repair case by the repair plan inferring means to influence the operation.

21. A self-repairing image-forming apparatus as claimed in claim 20, comprising conversion means for converting condition data from the sensor means to symbolic data and wherein the diagnostic means determines the condition of the image-forming apparatus from symbolic data from the conversion means and the diagnostic knowledge from the first memory.

22. A self-repairing image-forming apparatus as claimed in claim 21, further comprising updating means for updating the characteristic data.

23. A self-repairing image-forming apparatus as claimed in claim 22, wherein the characteristic data comprises reference value data and the interrelationship knowledge comprises mathematical model knowledge.

24. A self-repairing method for carrying out repair of an image-forming apparatus which has a plurality of interrelated elements, the interrelated elements including actuator elements for carrying out operations in the apparatus, and memory means which stores characteristic data representative of various characteristics of the apparatus, interrelationship knowledge representative of the interrelationships of the elements of the apparatus, diagnostic knowledge, repair case knowledge, and repair work script knowledge, said method comprising the steps of:
  receiving condition data indicative of the condition of the apparatus;
  determining whether the apparatus is in a normal or an abnormal condition based upon the received condition data, the characteristic data and the diagnostic knowledge;
  if the apparatus is in an abnormal condition, applying the repair case knowledge and the work script knowledge to infer a repair plan for influencing one of the actuator elements to change one of the operations in the apparatus.

25. A self-repairing method as claimed in claim 24, wherein said step of applying the repair case knowledge and the work script knowledge comprises the steps of:
  applying the interrelationship knowledge to identify a fault cause; and
  retrieving repair cases from the repair case knowledge and a repair work script from the work script knowledge which correspond with the identified fault cause.

26. A self-repairing method as claimed in claim 25, wherein the diagnostic knowledge comprises function evaluation knowledge, wherein said step of determining the condition of the image-forming apparatus comprises comparing the received condition data to the function evaluation knowledge to identify a fault symptom, and wherein said step of retrieving repair cases from the repair case knowledge comprises the steps of retrieving cases which correspond with the identified fault cause and the identified fault symptom.

27. A self-repairing method as claimed in claim 26, wherein said step of retrieving repair cases from the repair case knowledge comprises the step of prioritizing the retrieved cases to obtain a highest priority repair case.

28. A self-repairing method as claimed in claim 27, wherein the repair cases each comprise a repair work index field containing repair work index data and the work scripts include repair works which are associated with the work index data, and wherein said step of applying the repair case knowledge and the work script knowledge comprises the step of executing a repair work which is indicated by the repair work index data of the highest priority repair case and which is included in the retrieved work script.

29. A self-repairing method as claimed in claim 27, wherein the repair cases comprise a success rate field containing a success rate value and wherein, if after execution of the indicated repair work, the image-forming apparatus has been returned to its normal condition, the success rate value of the highest priority repair case is incremented.

30. A self-repairing method as claimed in claim 29, wherein the repair case comprises a failure rate field containing a failure rate value and wherein, if after execution of the indicated repair work, the image-forming apparatus has not been returned to its normal condition, the failure rate value of the highest priority repair case is incremented and a next highest priority repair case is applied as the highest priority repair case.

31. A self-repairing method as claimed in claim 30, wherein said method comprises the steps of:
if there is not a next highest priority repair case, inferring new repair works,
inferring secondary affects attributable to each inferred new repair work based upon the interrelationship data,
selecting a new repair work having the least inferred secondary affects from among the inferred new repair works, and
influencing the actuator element capable of changing operation of the apparatus in accordance with the selected new repair work.

32. A self-repairing method as claimed in claim 31, wherein the steps of inferring new repair works comprise the steps of inferring sequences of steps for reducing an inferred secondary affect and applying the repair plan knowledge to select a preferred sequence, and wherein the repair plan knowledge comprises knowledge that
(a) a preferred sequence must not include a step which is contradictory with a step in the selected new repair work,
(b) the preferred sequence must be inferred to have minimum further secondary affects, and
(c) the preferred sequence is aborted if a limit of an operating parameter is reached during performance of the preferred sequence.

33. A method of self-repair as claimed in claim 32, wherein if a selected new repair work fails, an alternative new repair work is selected on the basis of the next least number of inferred secondary affects.

34. A self-repairing method as claimed in claim 27, wherein the repair cases have pre-repair condition fields for containing pre-repair characteristic data, and
wherein said step of applying the repair case knowledge and the work script knowledge comprises the steps of comparing whether received condition data is the same as the pre-repair characteristic data of the highest priority repair case.

35. A self-repairing method as claimed in claim 34, wherein the repair cases have work index data fields for containing repair work index data, and the work scripts have repair works listed together with associated data representative of an antecedent condition for the work and an anticipated consequence of the work, and wherein said method comprises the steps of:
if the received condition data are the same as the pre-repair characteristic data of the highest priority repair case, executing a selected repair work indicated by the repair work index data provided by the priority repair case; and
if condition data from the sensor means are not the same as the pre-repair characteristics of the priority repair case, comparing the work antecedent data associated with the indicated repair work to received condition data which corresponds therewith, and
if the antecedent data of the indicated repair work and the corresponding received condition data are the same,
executing the indicated repair work, and
if the antecedent data and the received corresponding condition data are not the same,
determining whether the retrieved work script includes another repair work for influencing one of the actuator elements so that the corresponding received data will be the same as the antecedent data of the indicated repair work,
and if the work script includes another repair work for so influencing one of the actuator elements, executing said another repair work.

36. A self-repairing method as claimed in claim 35, wherein after said another repair work has been executed, said method comprises executing repair works listed in the retrieved repair work script according to the repair work index data provided by the highest priority repair case.

37. A self-repairing method as claimed in claim 36, comprising the steps of,
if after execution of said another repair work, the received condition data differs from the anticipated consequence of said another repair work, inferring a new repair case and a new work script.

38. A self-repairing method as claimed in claim 37, comprising the steps of converting received condition data to symbolic data.

39. A self-repairing method as claimed in claim 38, wherein the diagnostic knowledge comprises function evaluation knowledge, and wherein said step of determining whether the apparatus is in a normal or an abnormal condition comprises the steps of comparing the symbolic data with the function evaluation knowledge.

40. A self-repairing method as claimed in claim 38, wherein the characteristic data comprises reference value data and said method further comprises the step of updating the stored reference value data based upon the condition data from the sensor means after the apparatus has been returned to its normal condition.

41. A self-repairing method as claimed in claim 40, wherein the reference value data represent desired operating ranges for parameters associated with the elements of the apparatus, and said step of updating the reference value data comprises the steps of changing an original desired operating range to a new desired operating range.

42. A self-repairing method for carrying out repair of an image-forming apparatus which has a plurality of interrelated elements, the interrelated elements including actuator elements for carrying out operations in the apparatus, sensor means for sensing conditions in the apparatus and providing condition data indicative thereof, and memory means which stores characteristic data representative of various characteristics of the apparatus, interrelation knowledge representative of the interrelationships of the elements of the apparatus, diagnostic knowledge, repair case knowledge, and repair work script knowledge, said method comprising the steps of:
   receiving condition data;
   determining whether the apparatus is in a normal or an abnormal condition based upon the received condition data, the characteristic data and the diagnostic knowledge;
   if the apparatus is in an abnormal condition, applying the repair case knowledge and the work script knowledge to infer a repair work for influencing one of the actuator elements to obtain an anticipated condition of the actuator element, and
   if the inferred repair work fails to influence the actuator element to the anticipated condition, inferring new repair case knowledge based upon the applied case knowledge and work script knowledge.

43. A self-repairing method as claimed in claim 42, wherein said method comprises the step of inferring new work script knowledge.

44. A self-repairing method as claimed in claim 43, wherein said step of inferring new repair case knowledge comprises the steps of:
   retrieving all repair cases from the repair case knowledge which comprise pre-repair condition data that is common to all the retrieved repair cases and that is different from received condition data which corresponds to the common pre-repair condition data.

45. A self-repairing method as claimed in claim 44, wherein said step of inferring new repair case knowledge comprises the steps of
   inferring that a difference between the common pre-repair condition data and the corresponding received condition data is the reason for failure of the inferred repair work to return the image-forming apparatus to its normal condition,
   locating within a work script from the applied work script knowledge a corrective work for causing the corresponding received condition data to be the same as the pre-repair condition data of one of the retrieved repair cases, and
   executing the corrective work to influence one of the actuator elements.

46. A self-repairing method as claimed in claim 45, wherein said method comprises the steps,
   if the corrective repair work changed the corresponding received condition data to be the same as the pre-repair condition data, inferring new repair case knowledge and new work script knowledge by registering a new repair case which includes pre-repair condition data identical to characteristic data indicative of the condition of the image-forming apparatus when the apparatus was determined to be in an abnormal condition, and repair work index data which indicate a repair plan including the corrective repair work and repair works indicated by the repair work index data of said one of the repair cases.

47. A self-repairing method as claimed in claim 42,
   wherein the repair case knowledge comprises repair cases which each have pre-repair condition fields that contain pre-repair characteristic data, and the work script knowledge comprises work scripts that are associated with fault causes in the image-forming apparatus and each work script includes repair work data indicative of at least one repair work and,
   wherein said step of determining the condition of the image forming apparatus comprises the step of identifying a fault symptom based upon received condition data and the diagnostic knowledge,
   wherein said step of applying the repair case knowledge and the work script knowledge comprises the steps of applying the interrelationship knowledge to identify a fault cause, and retrieving repair cases that correspond with the identified fault cause and the identified fault symptom, and retrieving a work script that corresponds with the identified fault cause and,
   wherein said step of inferring new repair case knowledge comprises the steps of sorting all repair cases from the retrieved cases which have pre-repair characteristic data that are common to all the retrieved cases and that differ from received condition data which corresponds with the common pre-repair characteristic data,
   inferring that the reason why the inferred repair work failed to influence the actuator element according to the anticipated condition was because some of the received condition data differed from some of the common pre-repair condition data,
   locating a corrective repair work in the retrieved work script, and
   executing the corrective repair work to change the different received condition data to be the same as its corresponding pre-repair condition data in the sorted repair cases.

48. A self-repairing method as claimed in claim 47, wherein said method comprises the steps of if the corrective repair work failed to change the different received condition data to be the same as its corresponding pre-repair condition data, inferring that the reason why the corrective work failed was because other received condition data was different from its corresponding common pre-repair condition data.

* * * * *